United States Patent [19]

Neuhard et al.

[11] Patent Number: 6,052,198
[45] Date of Patent: Apr. 18, 2000

[54] METHOD FOR ORGANIZING RASTER IMAGE PROCESSOR FILES ASSOCIATED WITH A JOB TICKET USED IN A NETWORK PRINTING SYSTEM

[75] Inventors: Deborah Elisabeth Neuhard; Robert Curt Nielsen; Dwight Ross Palmer; Luana Vigil, all of Longmont, Colo.

[73] Assignee: International Business Machines Corporation, Armonk, N.Y.

[21] Appl. No.: 08/929,997

[22] Filed: Sep. 15, 1997

[51] Int. Cl.[7] .......................... B41B 15/00; B65H 29/00; B65H 39/10
[52] U.S. Cl. ........................ 358/1.15; 358/1.9; 358/1.16; 358/1.13; 358/296; 358/401; 271/279; 271/298
[58] Field of Search ..................... 395/114, 109, 395/115, 112; 358/296, 401, 1.15, 1.9, 1.16, 1.13; 271/298, 279; 399/346

[56] References Cited

U.S. PATENT DOCUMENTS

| | | | |
|---|---|---|---|
| 4,970,554 | 11/1990 | Rourke . | |
| 5,133,048 | 7/1992 | Parsons et al. | 395/111 |
| 5,450,571 | 9/1995 | Rosekrans et al. . | |
| 5,467,434 | 11/1995 | Hower, Jr. et al. . | |
| 5,600,762 | 2/1997 | Salgado et al. | 395/114 |
| 5,689,625 | 11/1995 | Austin et al. | 395/114 |
| 5,715,381 | 9/1994 | Hamilton | 395/114 |
| 5,761,396 | 11/1995 | Austin et al. | 395/114 |
| 5,781,711 | 7/1998 | Austin et al. | 395/114 |

OTHER PUBLICATIONS

IBM Print OnDemand Executive Summary and Planning Guide for RPQs 8B3967 and 8B3968 for the IBM 3900 Model DR1/DR2 High Resolution Printing System, Document No. G544–5324–00, dated Jun. 19, 1996.

IBM Print OnDemand User's Guide, Document No. G544–5325–00, Dated Jun. 20, 1996, author Dave Thomson, pp. 25–26, 39–42, and 45–46.

IBM OnDemand for AIX Using the Administrator Interface Version 2, Document No. S544–5279–00, dated May 1996.

*Primary Examiner*—Edward L. Coles
*Assistant Examiner*—Coulter Henry
*Attorney, Agent, or Firm*—David W. Victor; Konrad, Raynes & Victor, LLP

[57] ABSTRACT

The present invention discloses a system for organizing files associated with a job ticket, including raster image process (RIP) files. The files and job ticket are in a storage device attached to a computer system. The job ticket includes information on print files included in a print job, print file location information indicating a location of the print files in the storage device, and RIP file location information indicating a location of the RIP version of a print file in the storage device. The print files include data representing graphical images and the RIP version is generated from the print file. When the job ticket is submitted for printing, a RIP version is submitted in lieu of the print file if the RIP version was modified after the print file was modified. Any generated RIP versions may be saved in the storage device with their location indicated in the RIP file location information.

33 Claims, 19 Drawing Sheets

METHOD FOR ORGANIZING RASTER IMAGE PROCESSOR FILES ASSOCIATED WITH A JOB TICKET USED IN A NETWORK PRINTING SYSTEM

CROSS-REFERENCE TO RELATED APPLICATIONS

This application is related to the following co-pending and commonly-assigned applications:

Application Ser. No. 08/929,609, filed on same date herewith, by Chris Samuel Goertz. Leonard Corning Lahey, Robert Curt Nielsen, Dwight Ross Palmer, and Luana Vigil, entitled "A Method For Creating And Organizing A Job Ticket In A Network Printing System";

application Ser. No. 08/932,065, filed on same date herewith, by Leonard Corning Lahey, Deborah Elisabeth Neuhard, and Dwight Ross Palmer, entitled "A Method For Organizing Files Associated With A Job Ticket In A Network Printing System";

application Ser. No. 08/932,066, filed on same date herewith, by Deborah Elisabeth Neuhard, Robert Curt Nielsen, Dwight Ross Palmer, and Luana Vigil, entitled "Method For Customizing Print Attribute Choices Based On Selected Model, Media, And Printer,";

application Ser. No. 08/931,013, filed on same date herewith, by Leonard Corning Lahey, Dwight Ross Palmer, and John Stuart Walker, entitled "A Method for Organizing Files in a Library in a Network Printing System";

application Ser. No. 08/829,844, filed on same date herewith, by Leonard Corning Lahey, entitled "Method for Real Time Customization of a Dialog Box for Accessing a Library Within a Network Printing System";

application Ser. No. 08/929,637, filed on same date herewith, by Kate Goes In Center, Deborah Elisabeth Neuhard, Robert Curt Nielsen, and Dwight Ross Palmer, entitled "A System, Method, and Program for Using Animations to Show Page Layout Combinations in a User Interface for Submitting Print Jobs"; and application Ser. No. 08/929,627, filed on same date herewith, by Leonard Corning Lahey, Deborah Elisabeth Neuhard, and Dwight Ross Palmer, entitled "A System, Method, and Program for Including Within a User Interface Having File Menu Options an Ability to Make a New File Like a Pre-Existing File Wherein Any Pre-Existing File Can Be a Template for a New File";

BACKGROUND OF THE INVENTION

1. Field of the Invention

The present invention relates generally to organizing a job ticket that includes information describing the component files of a print job and, in particular, to a method, apparatus, and article of manufacture for organizing a raster image process (RIP) version of the component files associated with the job ticket.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, prior art systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user.

Job tickets typically only define the print attributes for a single file. However, a document may be comprised of multiple files, each having one or more print attributes. A file submitted to the printer often includes printer instructions in a page description language (PDL) such as PostScript™. Before a PDL file can be printed, its contents must be converted to a bit-mapped image format, also known as a raster image. A raster image processor translates PDL files to a raster image or RIP version of the file. In the desktop publishing environment, it can take several hours to transform a PDL print file to its RIP version.

In the prior art, an user putting together a document comprised of multiple files would have to manually keep track of the location of the different files and manually assemble the files for printing. Moreover, if users wanted to resubmit a previously generated RIP version of a file in order to avoid the processing time of transforming a PDL file to the RIP format, then they would have to store and keep track of the location of the RIP version of the files. Not only do users have to keep track of the location of the RIP version of the files, but they also have to make sure that the file has not been altered since the creation of the RIP version of the file. Print jobs comprised of multiple documents, which are further comprised of multiple files and the RIP versions of the files, only increase the complexity of the user's task. Thus, there is a need in the art for networking printing systems that eliminate these problems and facilitate the printing of complex documents comprised of multiple files stored throughout the network printing system.

SUMMARY OF THE INVENTION

To address the requirements described above, the present invention discloses a method, apparatus, and article of manufacture for organizing files associated with a job ticket, including raster image process (RIP) files. The files and job ticket are in a storage device attached to a computer system. A job ticket is created including information on a plurality of print files included in a print job, print file location information indicating a location of the print files in the storage device, and RIP file location information indicating a location of a RIP version of a print file in the storage device. The print files include data representing graphical images and the RIP version is generated from the print file.

The job ticket is submitted for printing. This involves accessing a print file in the location indicated in the print file location information and determining whether there is a RIP version of the accessed print file. Upon determining that there is a RIP version of the accessed print file, the RIP version is transmitted from the location indicated in the RIP file location information to a printer.

In further embodiments, upon determining that there is a RIP version of the accessed print file, a determination is made as to whether the RIP version was modified after the accessed print file was modified. The RIP version is transmitted to the printer only after it is determined that the RIP version was modified after the accessed print file was modified.

In yet further embodiments, a RIP version is generated from the accessed print file upon determining that the RIP version was modified before the accessed print file was modified or that there is no RIP version of the print file in the storage device. A generated RIP version is then transmitted to the printer. The generated RIP version may be saved in the storage device with its location indicated in the RIP file location information.

It is an object of the present invention to provide an improved system for organizing the RIP version of print files included in a print job in a job ticket.

It is a further object of the present invention to utilize any previously saved RIP versions of the print files included in the print job if the RIP version is more recent than the print file. In this way, the user may avoid the lengthy processing time needed to regenerate a RIP version for the print file.

It is yet a further object of the invention to save generated RIP versions of print files included in the print job for later use and maintain in the job ticket information indicating the location of the generated RIP versions.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

HARDWARE EVNIRONMENT

Figure 1:
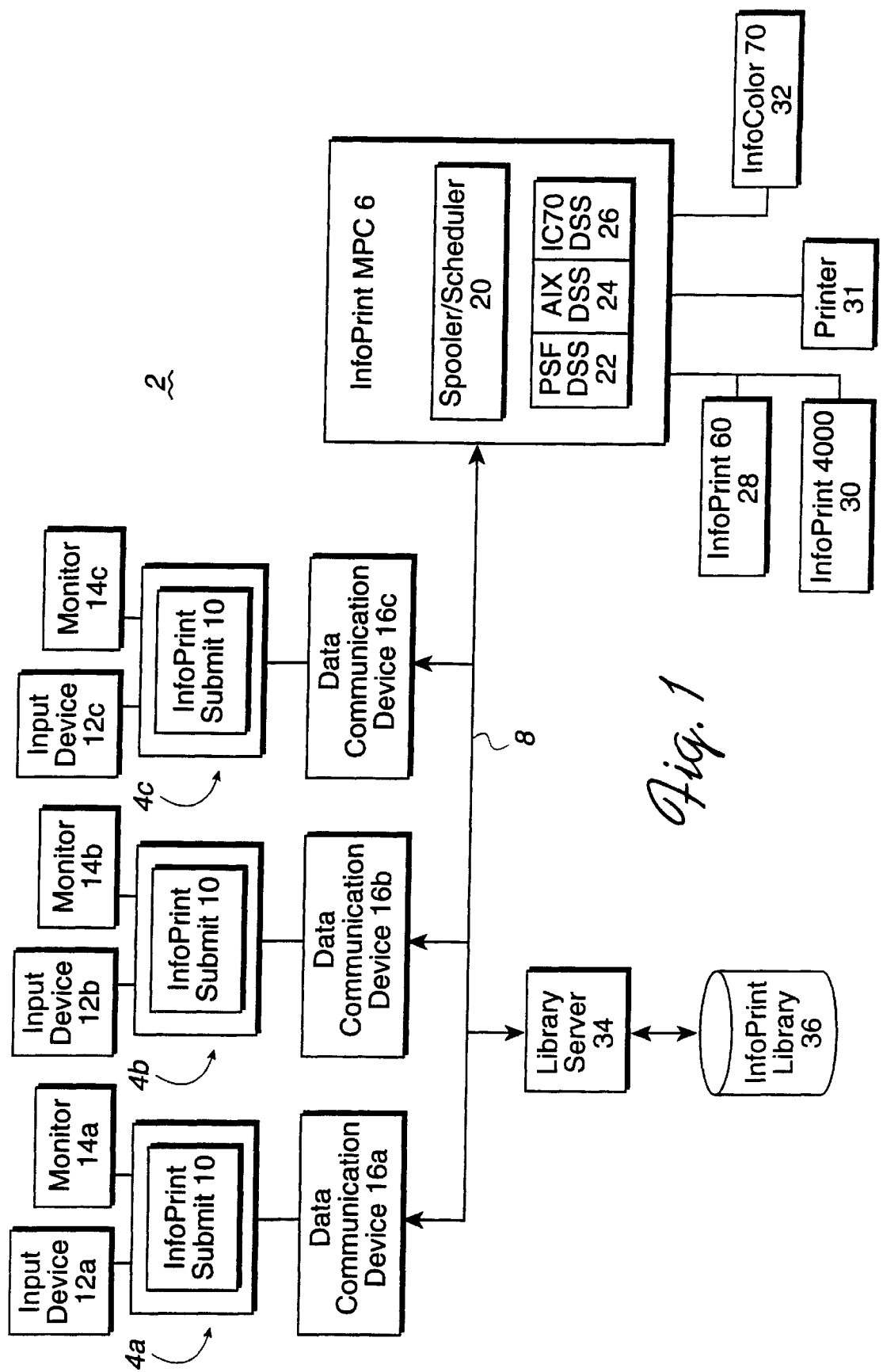
FIG. 1 is a block diagram illustrating an exemplary hardware environment for a network printing system in accordance with the present invention.

FIG. 1 shows a preferred embodiment of a network printing system 2 adapted to incorporate the present invention. The network printing system 2 comprises a plurality of client computers 4a, b, c that are connected to an InfoPrint Multiple Printer Controller (MPC) server 6 via a network 8 (e.g., Token-ring, LAN, Ethernet, WAN, TCP/IP, etc.).

In the preferred embodiment, the client computers 4a, b, c comprise personal computers that execute under the control of an operating system, such as the WINDOWS operating system. However, those skilled in the art will recognize that the client computers 4a, b, c could comprise any type of computer such as a workstation, mainframe, etc., and the operating system could comprise any operating system, such as OS/2, OS/390, MVS, VM, AIX, MACINTOSH, UNIX, etc. Installed on each client computer 4a, b, c is InfoPrint Submit software 10. The InfoPrint Submit software 10 configures the client computers 4a, b, c to allow the user to create and submit a job ticket in accordance with the present invention. Attached to each client computer 4a, b, c is an input device 12a, b, c (e.g., keyboard, mouse pointing device, voice activated input device, touch sensitive display, etc.), monitor 14a, b, c (e.g., CRT, LCD displays, etc.), as well as a data communication device 16a, b, c (e.g. modems, network interfaces, etc.) to interface with the network 8.

In the preferred embodiment, the InfoPrint MPC server 6 is an RS/6000 workstation that executes under the control of an AIX operating system. However, those skilled in the art will recognize that the InfoPrint MPC server 6 could be comprised of any type of computer such as a personal computer, workstation, server, minicomputer, mainframe, etc., and the operating system could comprise any operating system, such as OS/390, MVS, VM, OS/2, WINDOWS, MACINTOSH, UNIX, etc. Installed in the InfoPrint MPC server 6 is a spooler/scheduler 20, a Print Services Facility (PSF) device specific subsystem (DSS) 22, an AIX DSS 24, and an IC70 DSS 26.

The spooler/scheduler 20 is comprised of the InfoPrint executable code and includes a suite of applications. The spooler/scheduler 20 receives print jobs from the client computers 4a, b, c and generates printer files that are transmitted to a printer 28, 30, 31 or 32 that can appropriately handle the print job. In this way, the user may elect to not specify a printer in the network printing system 2 and let the spooler/scheduler 20 select an appropriate printer 28, 30, 31 or 32.

After processing the print job and selecting a destination printer 28, 30, 31 or 32 for the job, the spooler/scheduler 20 sends the print job to one of the device specific subsystems PSF DSS 22, AIX DSS 24, and IC70 DSS 26. The DSS programs 22, 24, and 26 are device drivers for driving printers 28, 30, 31, 32 attached to the InfoPrint MPC server 6, wherein the PSF DSS 22 drives printers 28 and 30, the AIX DSS 24 drives printer 31, and the IC70 DSS 26 drives printer 32. In the preferred embodiment shown in FIG. 1, the printers attached to the InfoPrint MPC server 6 include an InfoPrint/60 printer 28, an InfoPrint/4000 printer 30, and an InfoColor/70 printer 32.

Also connected to the network printing system 2 is a library server 34 storing an InfoPrint library 36 of files and job tickets. In preferred embodiments, the library server 34 is a RISC System/6000 that executes under the AIX operating system and includes the IBM DB2/6000 database software which provides database management services for the library 36. However, those skilled in the art will recognize that the library server 34 could comprise a personal computer, workstation, mainframe etc. and the operating system could comprise OS/2, WINDOWS, UNIX, O/S390, MVS, VM, etc., and that alternative database programs could be used in lieu of IBM's DB2/6000. In alternative embodiments, the InfoPrint MPC server 6 may be the hardware platform for the library server 34. The InfoPrint library 36 is a complete document storage system that archives printing files, application source data, fonts, images, TIFF data, etc. The client computers 4a, b, c may directly access, store, view and retrieve files and job tickets from the InfoPrint library 36. The hardware and software arrangement of the library server 34 and InfoPrint library 36 is further described in application Ser. No. xx/xxx,xxx, filed on same date herewith, by Leonard Corning Lahey, Dwight Ross Palmer, and John Stuart Walker, entitled "A Method for Organizing Files in a Library in a Network Printing System," attorney's docket number AM9-97-103 and application Ser. No. xx/xxx,xxx, filed on same date herewith, by Leonard Corning Lahey, entitled "Method for Real Time Customization of a Dialog Box for Accessing a library Within a Network Printing System," attorney's docket number AM9-97-114. Both these applications were incorporated by reference above.

It should be appreciated that, in alternative embodiments, the network printing system 2 may be comprised of components and products other than those discussed above. Moreover, the network printing system 2 can be implemented on different operating systems and hardware. For instance, hardware and software from manufacturers other than IBM may be used to perform the functions of the InfoPrint MPC server 6, the spooler/scheduler 20 and DSS drivers 22, 24, and 26, the library server 34, and the InfoPrint library 36. Printers having printing capabilities different from the disclosed printers 28, 30, and 32 may be used. Further, in alternative embodiments, any number of client computers 4a, b, c having alternative user interfaces may be used. Still further, the client computers 4a, b, c may connect to the InfoPrint MPC server 6 via multiple networks and remote lines. Those skilled in the art will recognize that other alternative hardware and software environments may be used without departing from the scope of the present invention. As such, the exemplary environment in FIG. 1 is not intended to limit the present invention.

JOB TICKET

The present invention includes the data structure of an electronically-stored job ticket and the computer-implemented method, apparatus, and article of manufacture used to create the job ticket. The job ticket of the present invention maintains information on print attributes and the location of the print files which comprise the print job.

Figure 2:
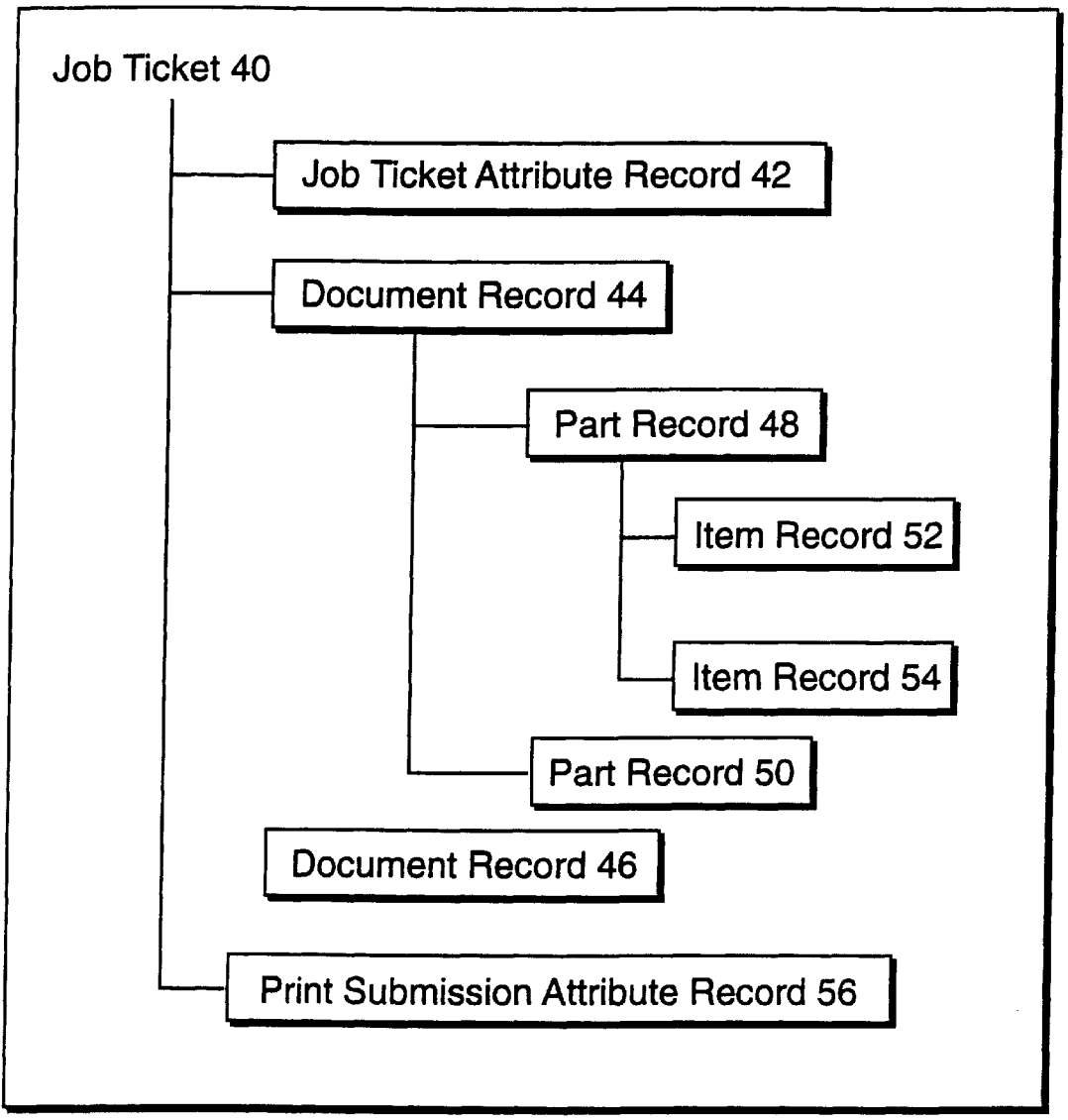
FIG. 2 is a block diagram illustrating a preferred embodiment of a job ticket data structure in accordance with the present invention.

FIG. 2 shows a preferred embodiment of the hierarchical tree structure arrangement of data within a job ticket 40 as stored in a data structure in a memory or as stored as a file in a data storage device. The first record in the job ticket 40 is a job ticket attribute record 42, which includes identification information, such as the file name containing the job ticket 40, a job ID, the customer name, etc.

Within each job ticket 40 are also one or more document records, wherein FIG. 2 shows two document records 44 and 46. The document records 44, 46 include all the information the InfoPrint MPC server 6 needs to print a document included in the print job.

Each document record 44, 46 is associated with one or more part records. Document record 44 is associated with two part records 48 and 50. A part is the smallest component submitted to the printer for printing. For instance, if the document is comprised of a black and white text body with a color cover, one part 48 would be the black and white text and another part 50 would be the color cover.

Each part record 48, 50 is a grouping of one or more item records. Part record 48 is a grouping of two item records 52 and 54. An item record includes information on a component of the print job. In preferred embodiments, item records 52, 54 may include information on the following item types: a file item; a hardcopy item; a library file item; variable data; and an inventory item.

A file item is a print image file, such as a TIFF, PostScript, RIP, PDF or PCL file. Included in the item records 52, 54 is information on the location of the item, e.g., the location of the print image file within the network printing system 2 and the location of the source file from which the print image file item was generated. The user may want to know the location of the source file to modify the contents of the print image. The location information included in the item records 52, 54 is used to access the print image files for printing.

A hardcopy item is a list of scanned TIFF files.

A library file item is a file archived in the library 36. The library file item may include information on the location of the library file within the library 36.

Variable data includes files used to create customized print settings to add to the print job, e.g., adding the name and address of the customer to the printed document.

The inventory item includes information on an item to be packaged with the document 44, 46 which is not printed, such as a diskette, CD-ROM, etc.

Thus, an "item" includes print image files comprised of data representing graphical images that are associated with the file item, hardcopy item, library file item or variable data item. The item records 52, 54 also include information on files associated with the print image files for the item. Such associated files may include a source file from which the file item was generated, a Raster Image Processor format of the file item, and a viewable version of the format item. For instance, if the file item is a PostScript file, then the viewable version would be in the PDF file format. Other file types may also be associated with the items.

In the present invention, the job ticket 40 stores print attribute information, such as information on the layout of the printed page, the printer selected, the alignment of the page, and the look of the page, for each element included in the job ticket 40. As used herein, the term "element" means any of the document records 44, 46, part records 48, 50, and item records 52, 54 included in the job ticket 40. Any print attribute information set for an element at a higher hierarchical level in the tree applies to the elements at the lower hierarchical levels which branch from that higher element. For instance, print attribute information set at the document record 44 level automatically applies to the part records 48, 50 and the item records 52, 54 which branch from the document record 44. Print attribute information set at the part record 52 level likewise applies to the items 52, 54 branching therefrom. In this way, the lower level elements inherit the print attributes of the higher level elements from which they branch.

The print submission attribute record 56 includes information on the print job, such as scheduling options, priority, difficulty, etc. The information in the print submission attribute record 56 does not affect what is printed, but instead concerns the work flow of the print job.

In preferred embodiments, print attribute information is stored as key/value pairs. The key is the mode or name of the attribute and the value is the value for the operation. For instance, to indicate a selection of a media type for a print job, the print attribute information would be stored as Input Bin/Tray 1. The key is the input bin containing the selected media, and the user selected value is the first tray. This key/value method for representing print attribute information is readily extendible. To add additional values for specific print attribute types, the new value would be described with reference to its key. Thus, when the InfoPrint Submit software 10 and print driver programs 22, 24, 26 are processing the print attribute information, they immediately recognize the operation the value represents.

INFOPRINT SUBMIT SOFTWARE

The job ticket 40 may be created on the client computer 4a, b, c using the InfoPrint Submit software 10 installed thereon. The InfoPrint Submit software 10 includes a graphical user interface (GUI) displayed on the monitor 14a, b, c that the user may use to create the job ticket 40. The InfoPrint Submit software 10 then translates the job ticket 40 created thereby to a format compatible with the InfoPrint MPC server 6.

The client computer 4a, b, c transmits this translated job ticket 40 along with the items identified in the item records 52, 54 to the InfoPrint MPC server 6 over the network 8. The InfoPrint MPC server 6 uses the information in the translated job ticket 40 to process the transmitted items 52, 54 and generate printer files based thereon. The InfoPrint MPC server 6 then selects an appropriate printer 28, 30, 31 or 32, to print the print job and transmits the printer files to the selected printer 28, 30, 31 or 32 for printing.

When printing copies of the items or a part including a group of items, the InfoPrint MPC server 6 prints a cover sheet on top of each set of copies including the information in the job ticket attribute record 42 to identify the set of copies. The user can then gather the copies generated at different printers throughout the network printing system 2 and assemble the final document using the information on the cover sheet for guidance.

In this way, the present job ticket invention maintains information on all the documents included in a customer order and all information needed by the InfoPrint MPC server 6 to print the different documents within a customer order.

GRAPHICAL USER INTERFACE

FIGS. 3, 4a, 4b, 4c, 5a, 5b, 6a, 6b, 6c, 7a, 7b, 8, 9, and 10 are illustrations of the graphical user interface (GUI) 60 provided by the InfoPrint Submit software 10. The user creates the job ticket 40 by entering information into different fields and selecting specific options presented in the GUI 60. Standard user interface mechanisms are preferably implemented in the GUI 60 to provide the user with the necessary functionality and ease of use.

Figure 3:
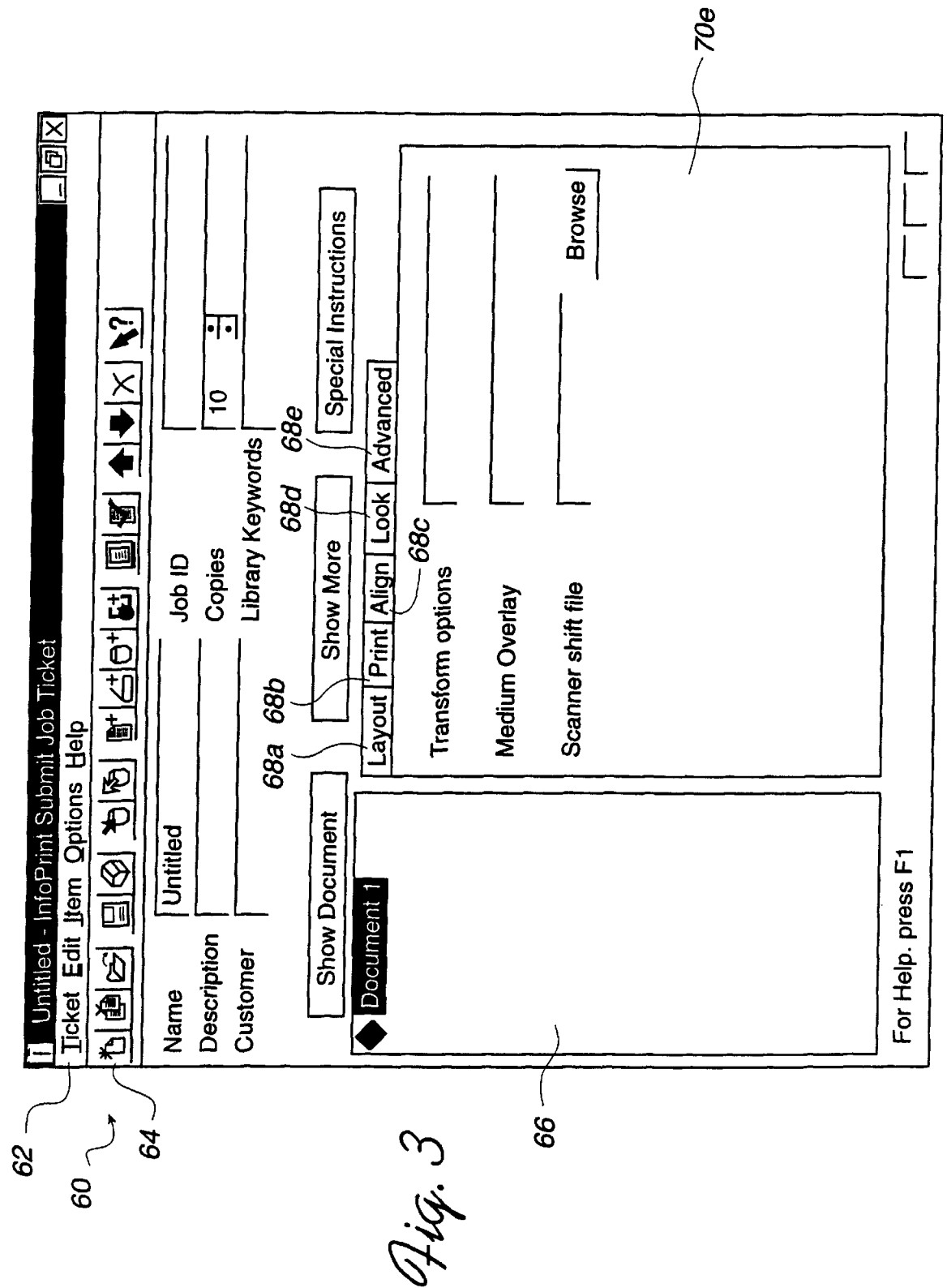
FIGS. 3, 4a, 4b, 4c, 5a, 5b, 6a, 6b, 6c, 7a, 7b, 8, 9, and 10 illustrate a preferred embodiment of a graphical user interface (GUI) displayed on a monitor in accordance with the present invention.

FIG. 3 shows the GUI 60 presented to the user upon selecting the job ticket option via an icon or command. At the upper portion of the GUI 60 is a main menu item bar 62 that includes main menu items Ticket, Edit, Item, Options, and Help. Selecting one of the main menu items with a mouse or keyboard command, invokes a further submenu of functions available to the user. Table 1 shows the submenus for each main menu item and functions included therein. Table 2 shows all the functions associated with each main menu item and provides a description of the behavior of each of the functions. Below the main menu item bar 62 is a tool bar 64 comprised of icons that represent certain functions. Below the tool bar 64 is an area presenting six fields labeled Name, Description, Customer, Job ID, Copies, and Library. These six fields comprise the information in the job ticket attribute record 42. The user places the cursor in one of the fields with the mouse and then enters the identification information.

The GUI 60 further includes a tree section 66 for displaying the elements (document records 44, 46 and item records 52, 54) associated with the job ticket 40. FIG. 3 shows only a single document element, Document 1. Associated with each element in the tree section 66 are print attribute page tabs 68a, b, c, d, e, which in the preferred embodiment are radio buttons displayed on the GUI 60. The user can cause the display of a Layout, Print, Align, Look, and Advanced print attribute page 70a, b, c, d, or e by selecting one of the corresponding print attribute page tabs 68a, b, c, d, e. FIG. 3 illustrates the Advanced print attribute page 70e, which includes fields in which the user may specify a transform option to override any conflicting attributes and to build a new document object.

Figure 4A:
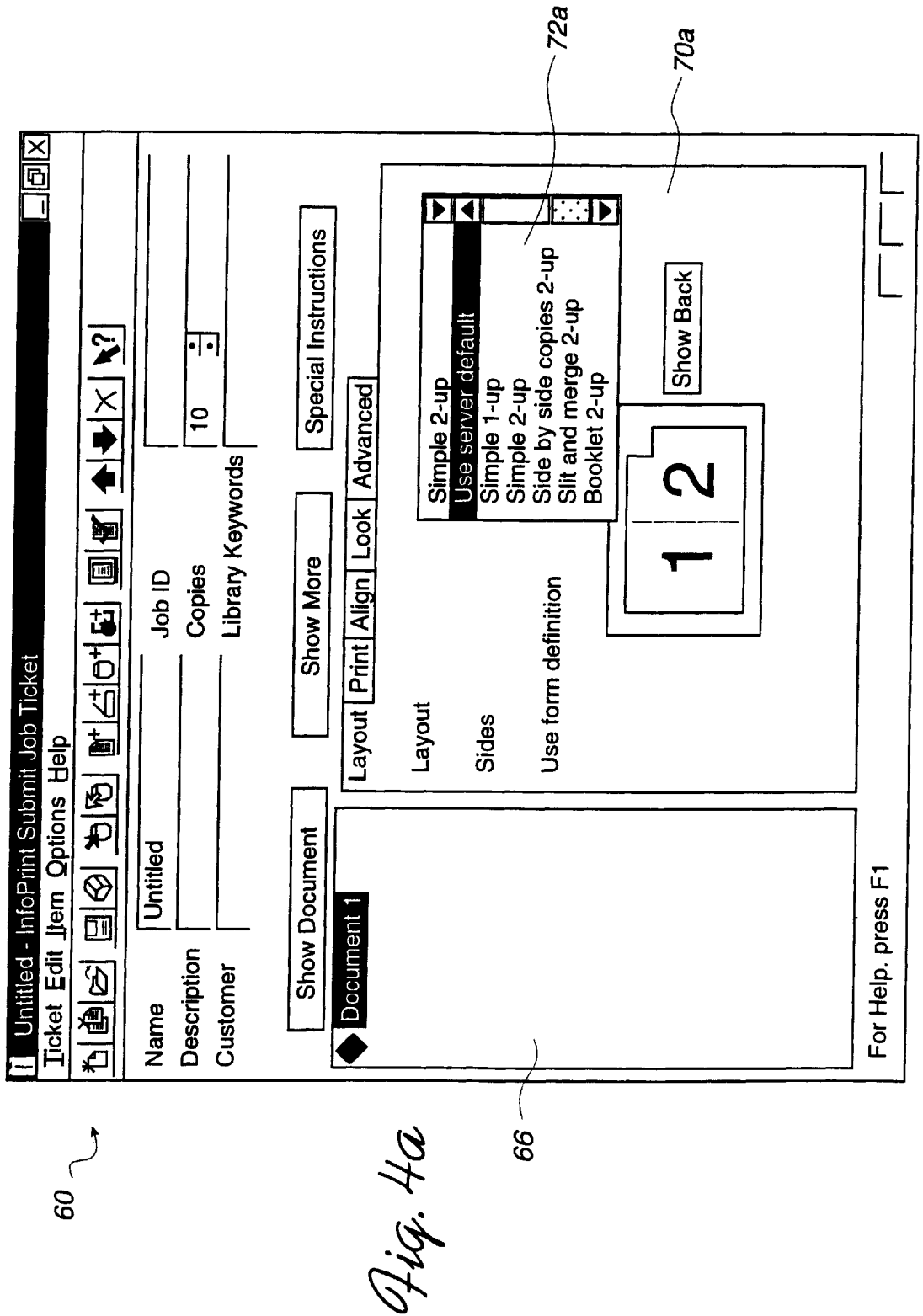
Figure 4B:
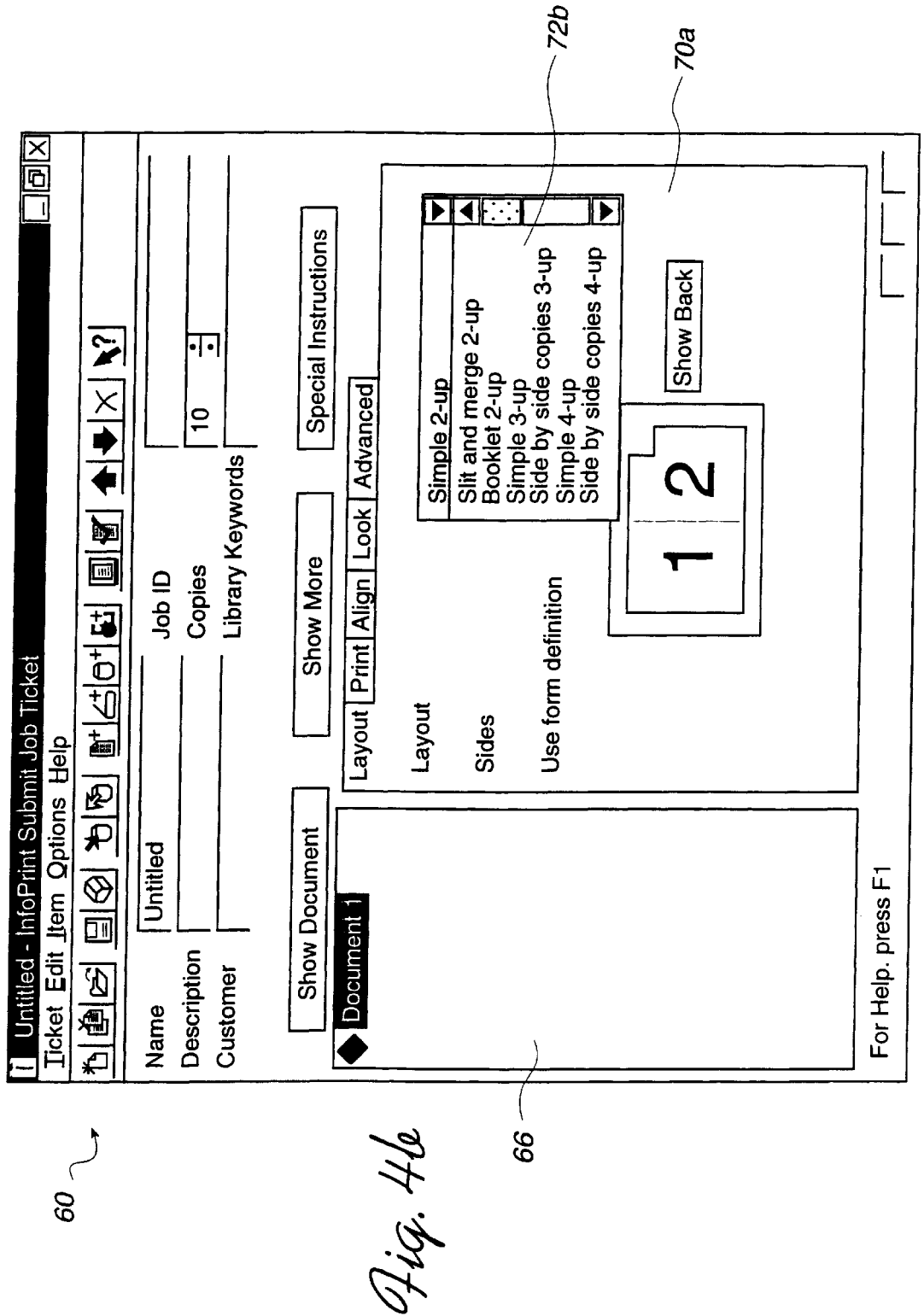
Figure 4C:
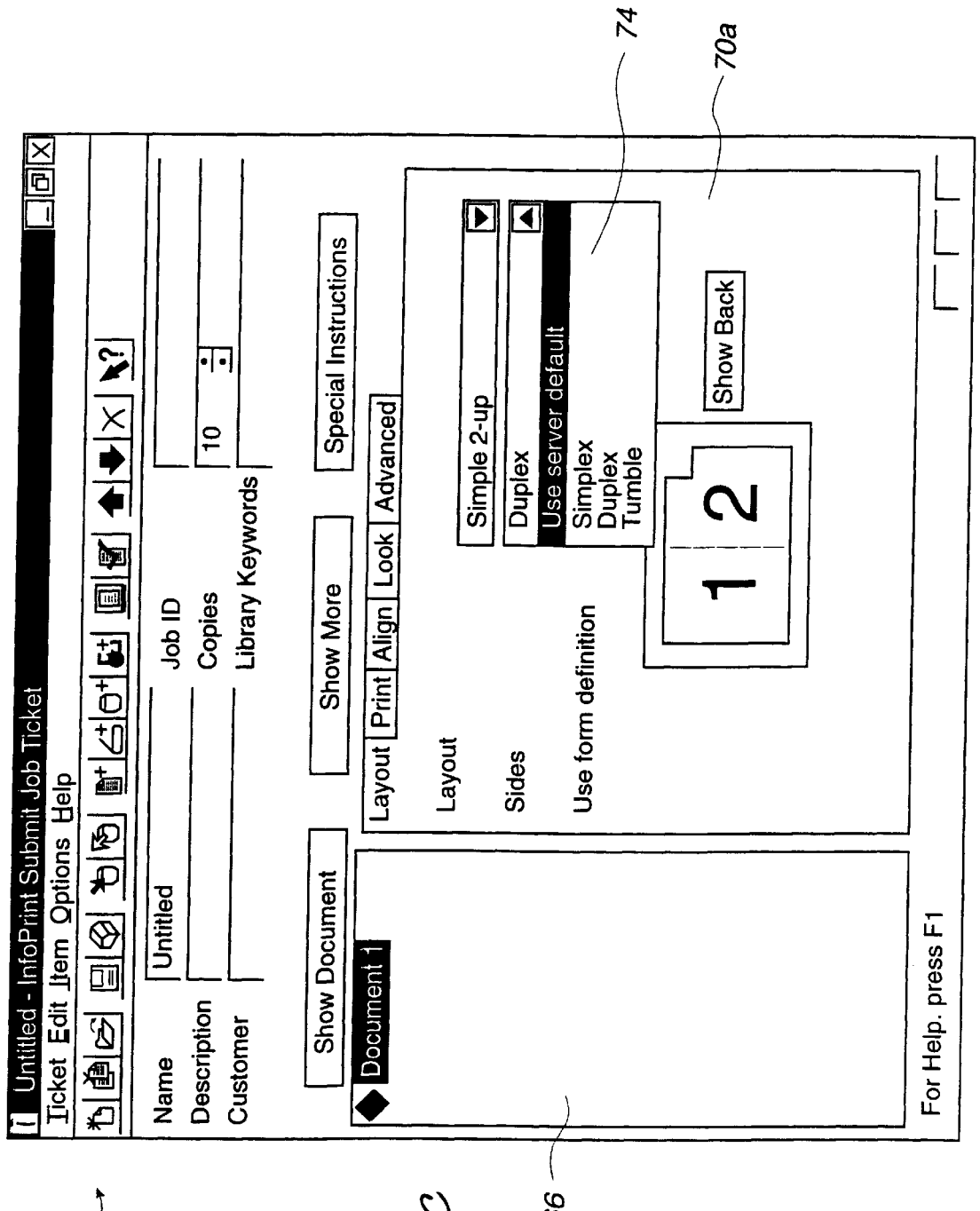

FIGS. 4a, 4b, 4c, 5a, 5b, 6a, 7b, 7c, 8a, and 8b show the print attribute pages 70a, b, c, d associated with Document 1 in the tree section 66. Table 3 provides the print attribute pages 70a, b, c, d, e available for each type of element. FIGS. 4a, 4b, and 4c illustrate a preferred embodiment of the Layout attribute page 70a, in which the user may specify the layout of the printed pages. FIGS. 4a, b show drop down menus 72a, b, respectively, of layout options, e.g., whether the pages are printed side by side, booklet style, etc. FIG. 4c shows a drop down menu 74 of side options, e.g., to print on two sides, one side, etc. Table 4 provides a description of the values in the Layout attribute page 70a and the behavior of the Layout attributes.

Figure 5A:
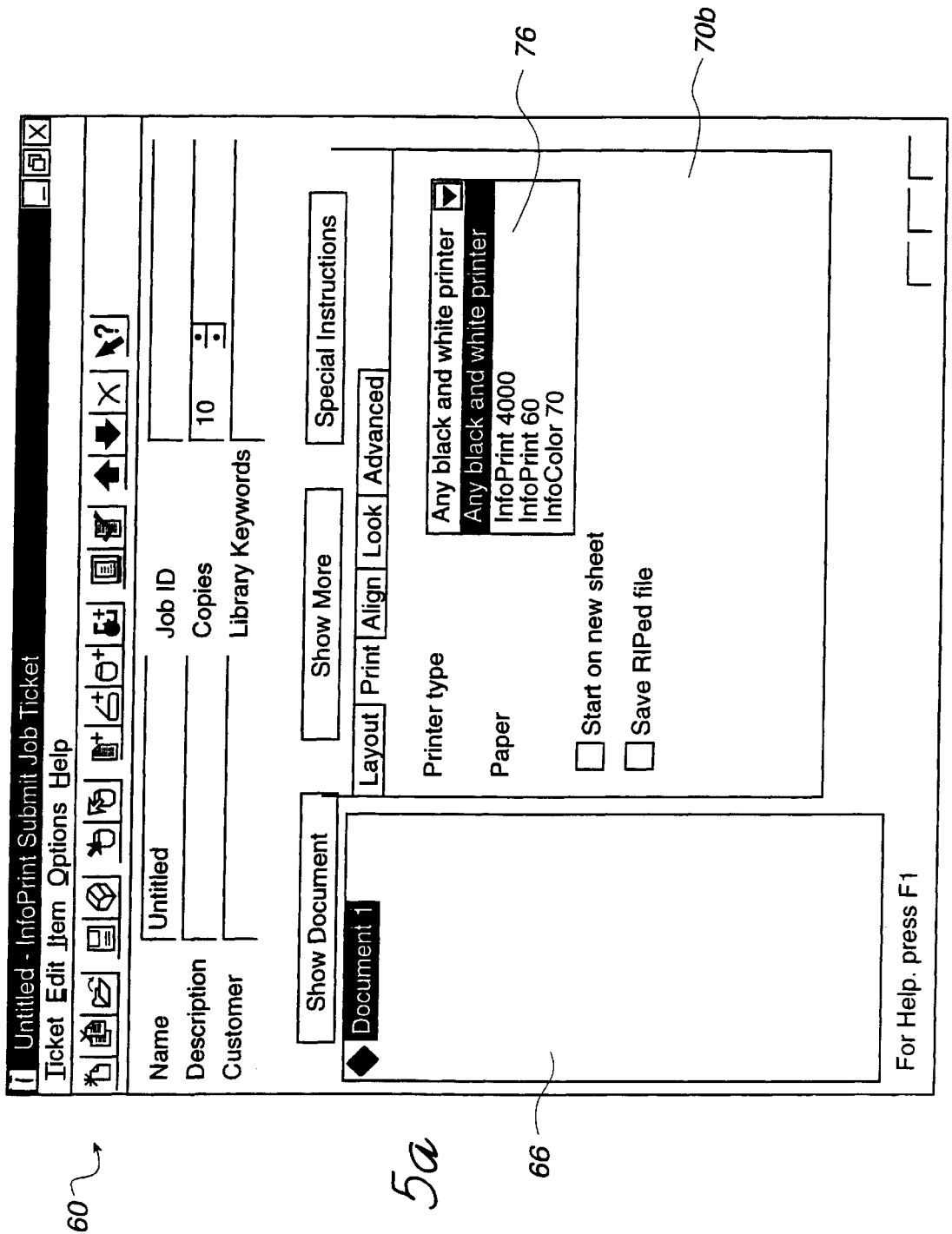
Figure 5B:
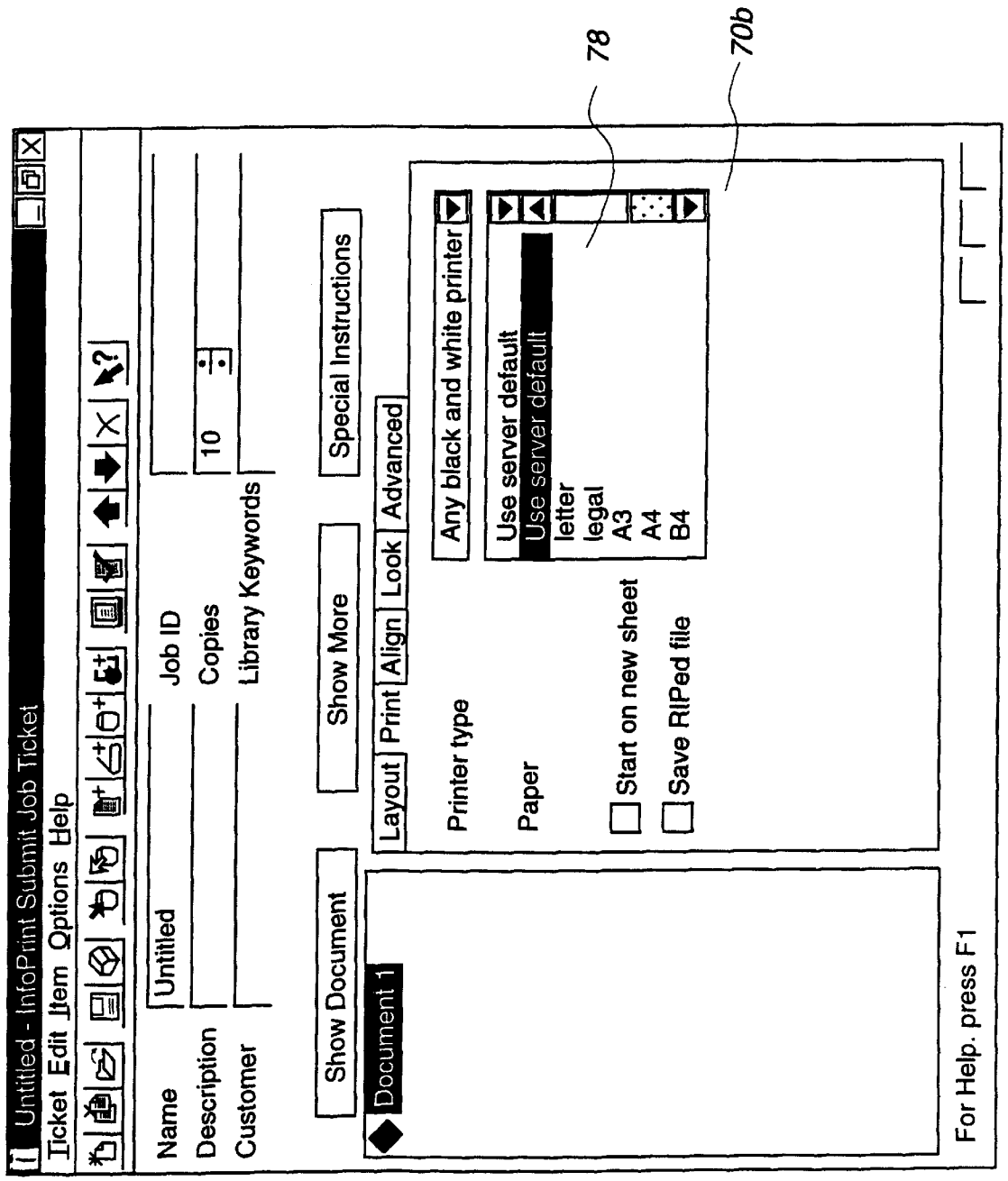

FIGS. 5a, b illustrate a preferred embodiment of the Print attribute page 70b. FIG. 5a shows a drop down menu for a Printer type 76 field in which the user can specify any printer or a specific printer 28, 30, 31 or 32 to print the Document 1. If the user selects a specific printer 28, 30, 31 or 32, then the InfoPrint Submit software 10 modifies the range of print attribute values available in pages 70a, b, c, d, e to include only those print attribute values supported by the selected printer 28, 30, 31 or 32. FIG. 5b shows a drop down menu for a Paper type 78 field in which the user may select a paper type. Table 5 provides a description of the attributes in a preferred embodiment of the Print attribute page 70b and the behavior of the attributes.

Figure 6A:
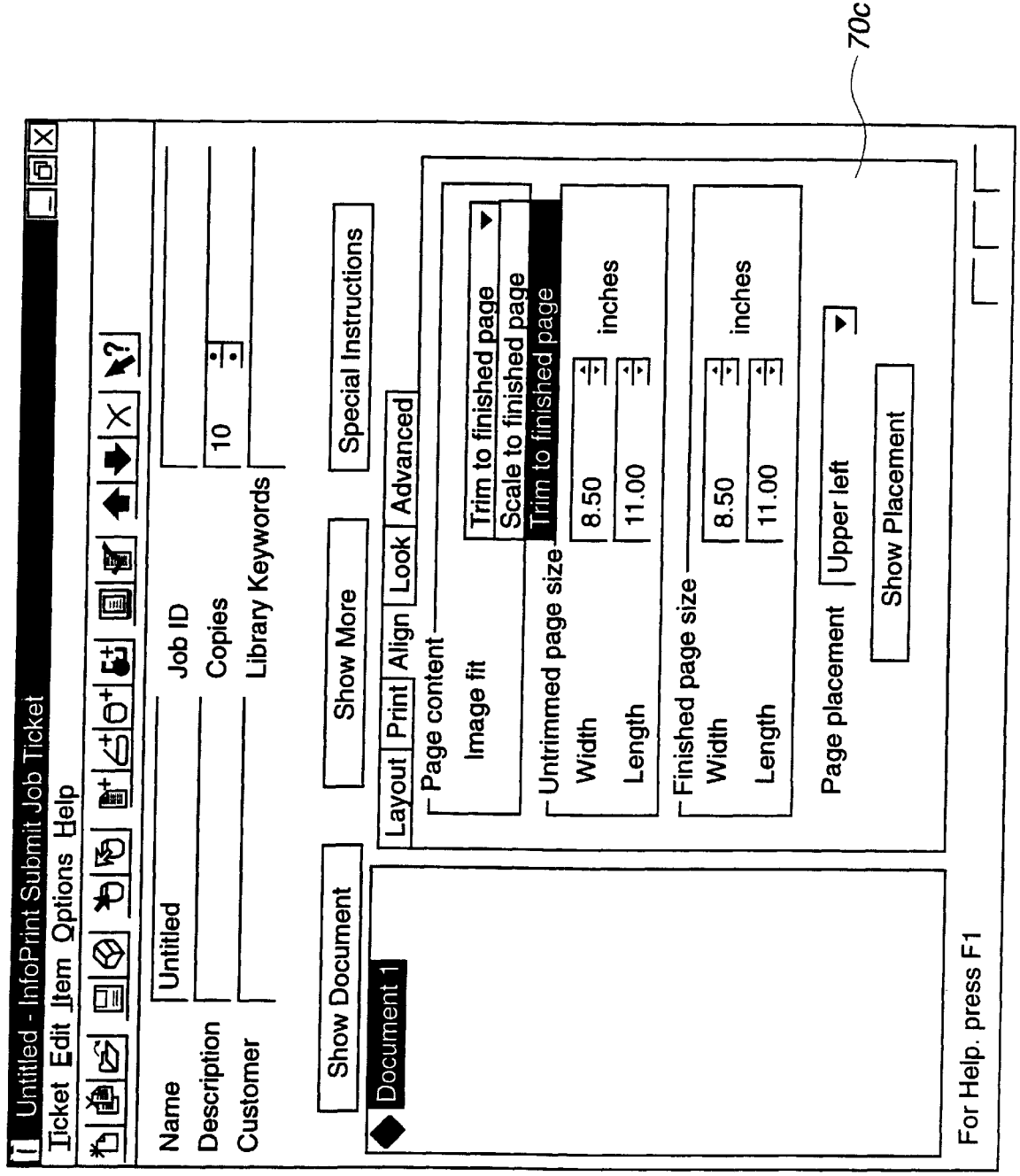
Figure 6B:
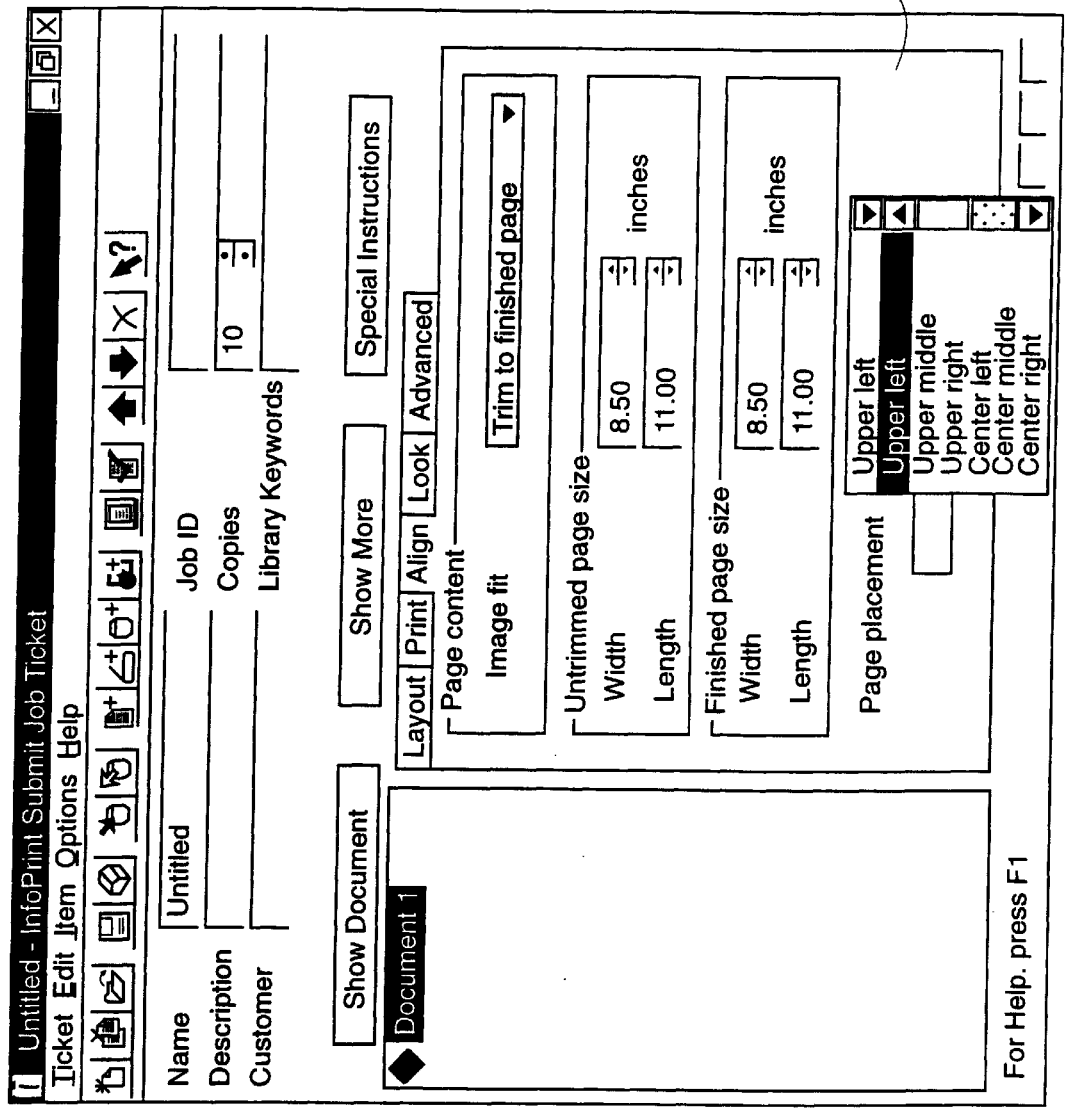
Figure 6C:
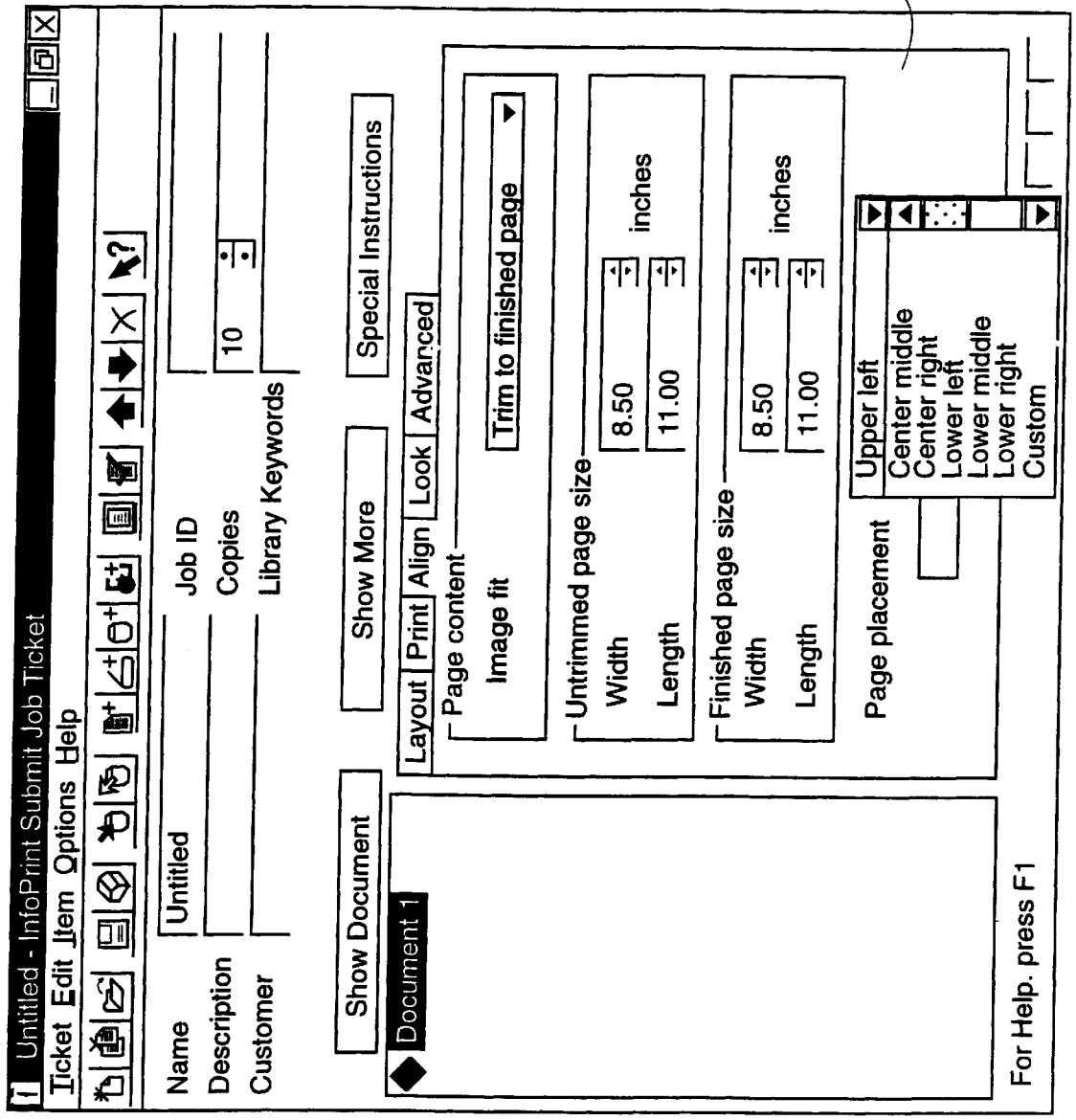

FIGS. 6a, 6b, and 6c illustrate the Align attribute page 70c, which allows the user to specify the orientation and placement of the of the page. Table 6 provides a description of the attributes in a preferred embodiment of the Align attribute page 70c and the behavior of the Align attributes.

Figure 7A:
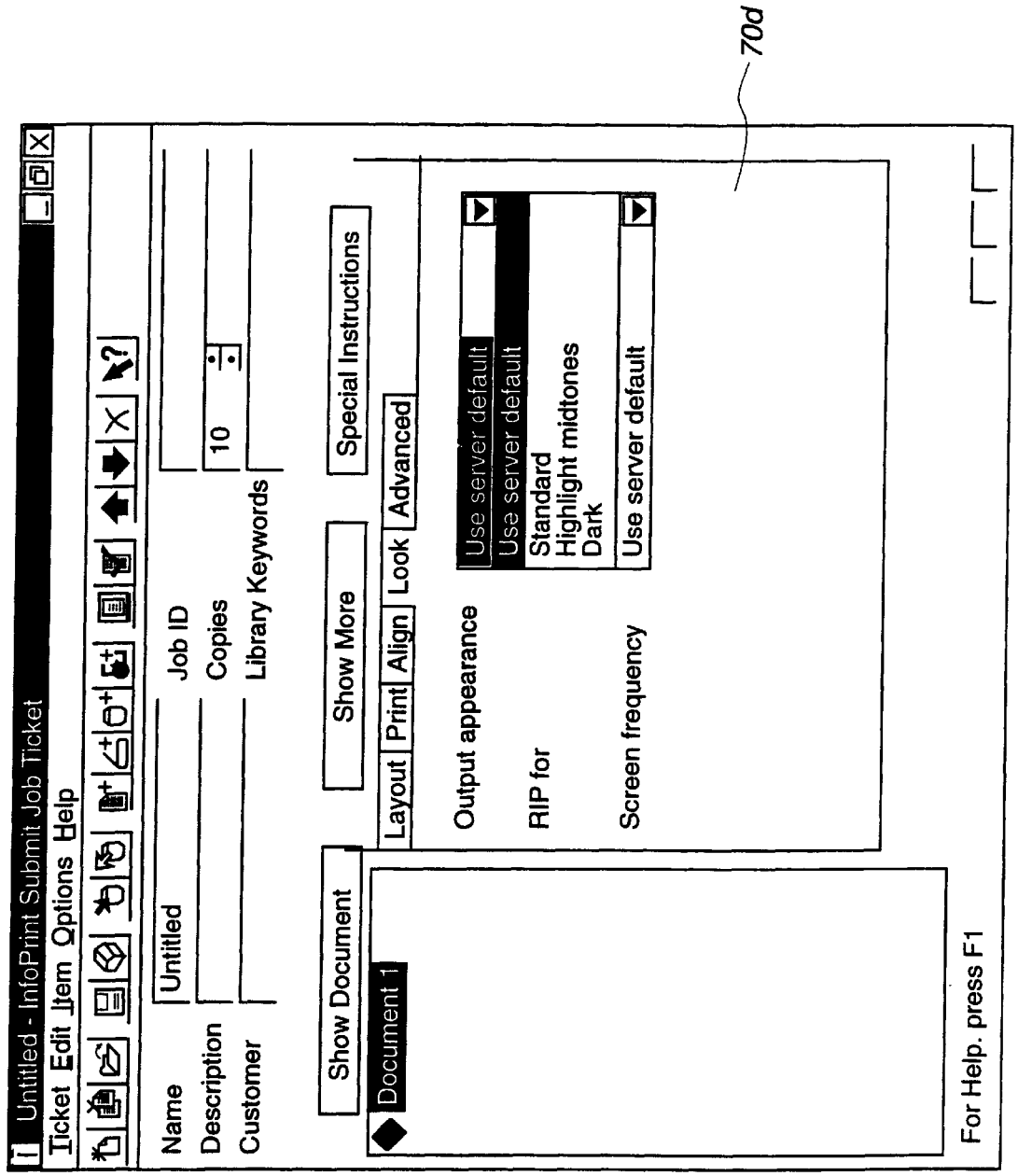
Figure 7B:
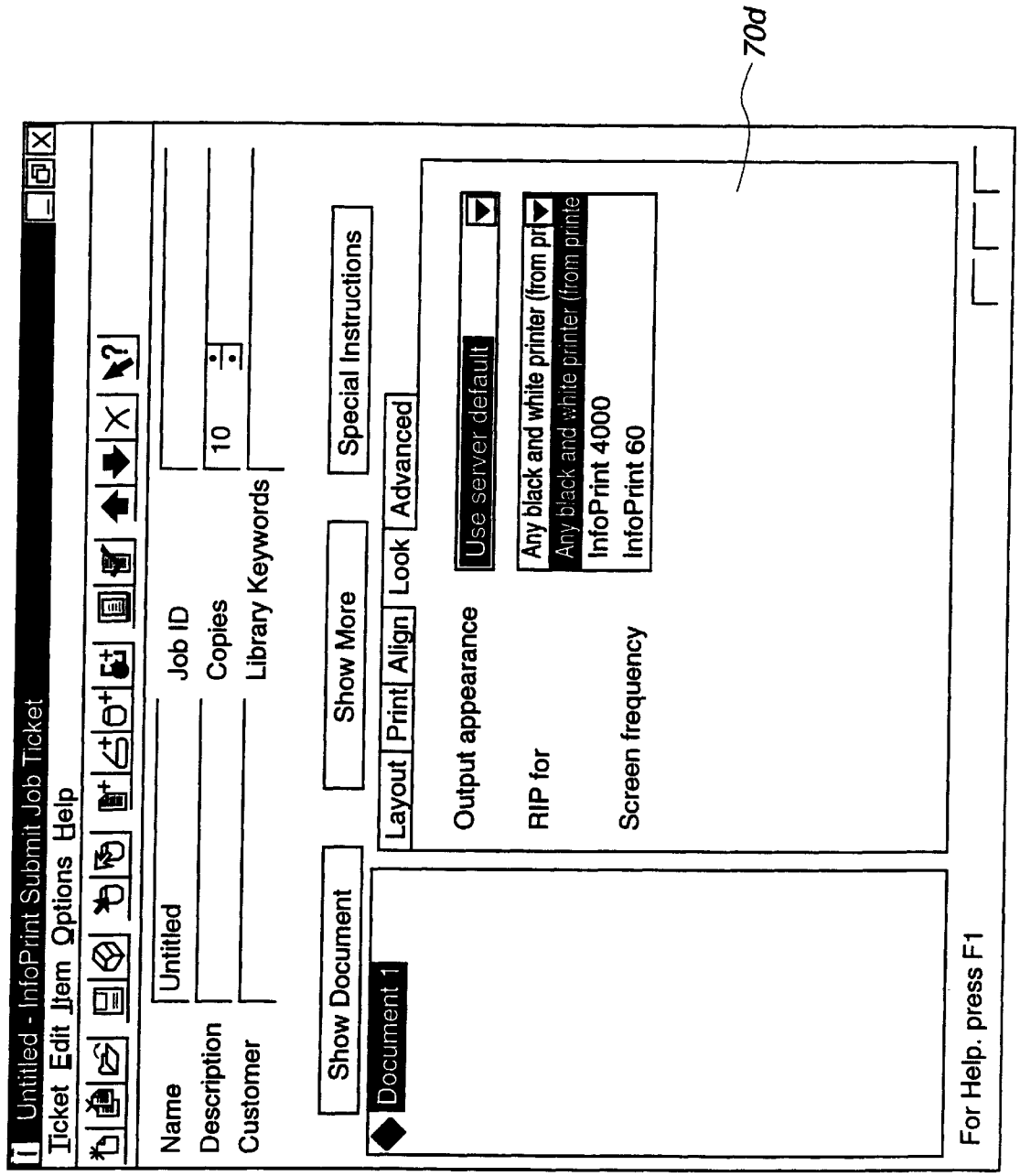

FIGS. 7a and 7b illustrate the Look attribute page 70d and accompanying drop down menus. The Look attribute page 70d includes fields in which the user can set the look of the printed output, e.g., standard, dark, etc., and identify the printer that will receive rasterized data. Table 7 provides a description of the attributes in a preferred embodiment of the Look attribute page 70d and the behavior of the Look attributes.

Figure 8:
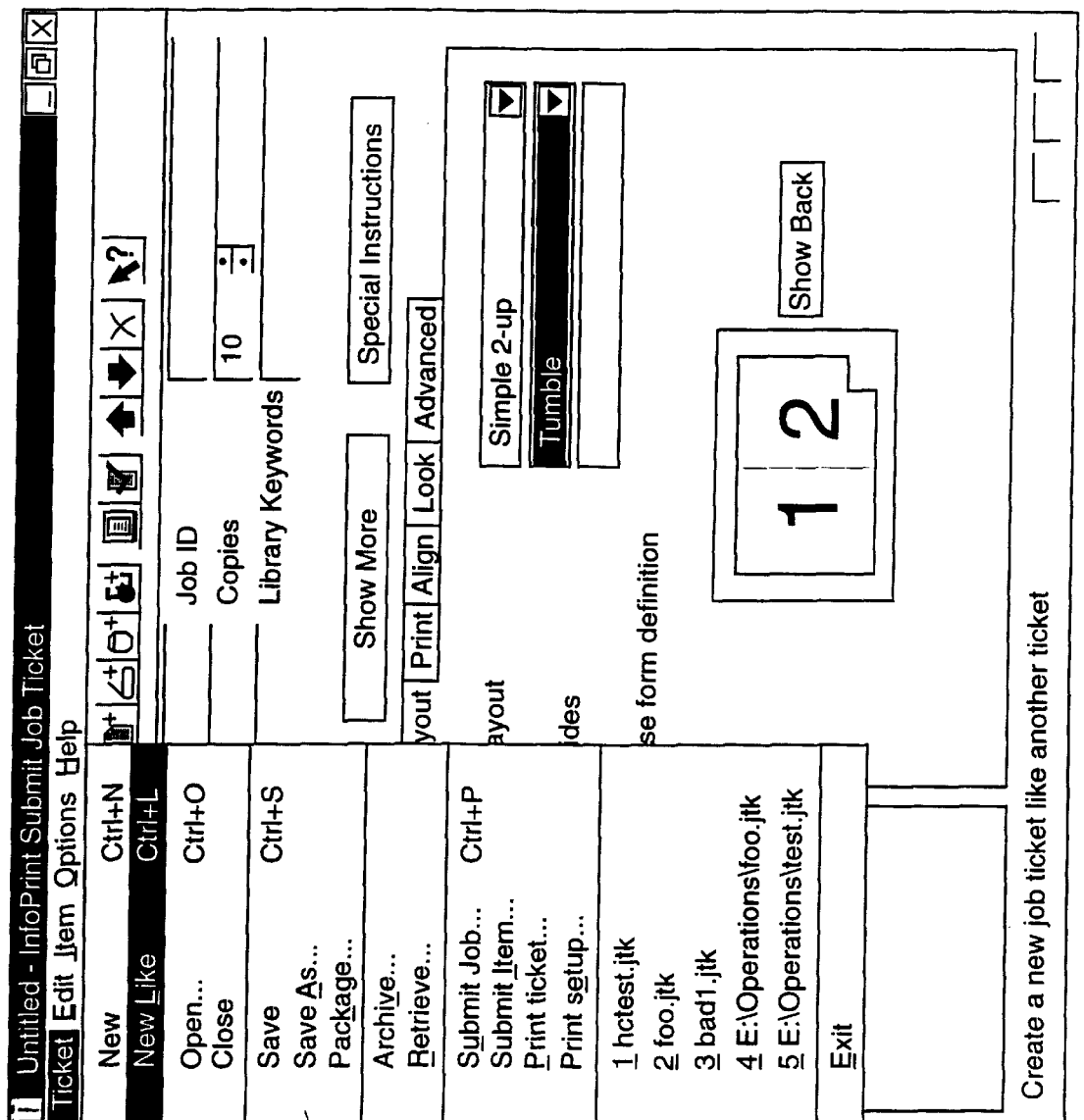

FIG. 8 shows a submenu 80 displayed when the user selects the Ticket item from the main menu item bar 62. The functions included in the submenus of the main menu items may be represented as an icon or alphanumeric string displayed in the GUI 60. The submenu 80 represents the functions as alphanumeric strings describing the function. The Ticket submenu 80 includes functions which allow the user to open a previously created job ticket (Open), create a new job ticket (New), save a job ticket the user has modified (Save or Save as), print the opened job ticket 40 (Print Ticket) or submit the job ticket to the InfoPrint MPC server 6 for printing (Submit Job). The Ticket submenu 80 further includes the Submit function which allows the user to enter the information for the print submission attribute record 56. The Submit function allows the user to select a File and Schedule pages into which the user may enter scheduling priority setting information for the job ticket 40. Tables 8 and 9 provide a description of a preferred embodiment of the fields and behavior of such fields in the File and Schedule pages.

Once the user creates a job ticket, the user may save the job ticket 40 or submit the job ticket 40 to the printing services manager 6 using the Save and Submit Job functions displayed in the Ticket submenu 80.

Figure 9:
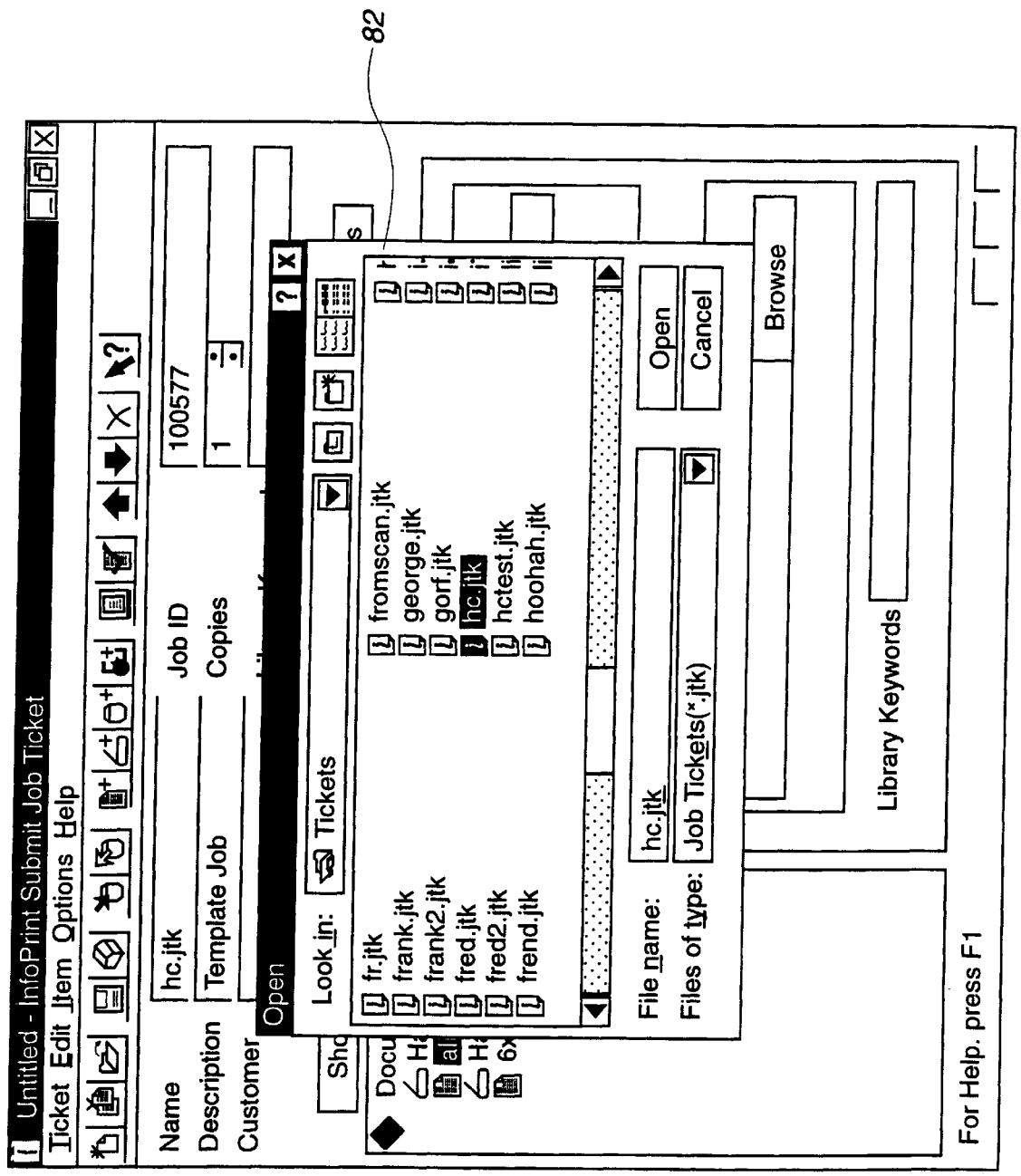

FIG. 9 shows an Open dialog box 82 that appears when the user selects the Open function from the Ticket submenu 80 (FIG. 8). The user may select and open one of the previously saved tickets displayed in the Open dialog box 82.

Figure 10:
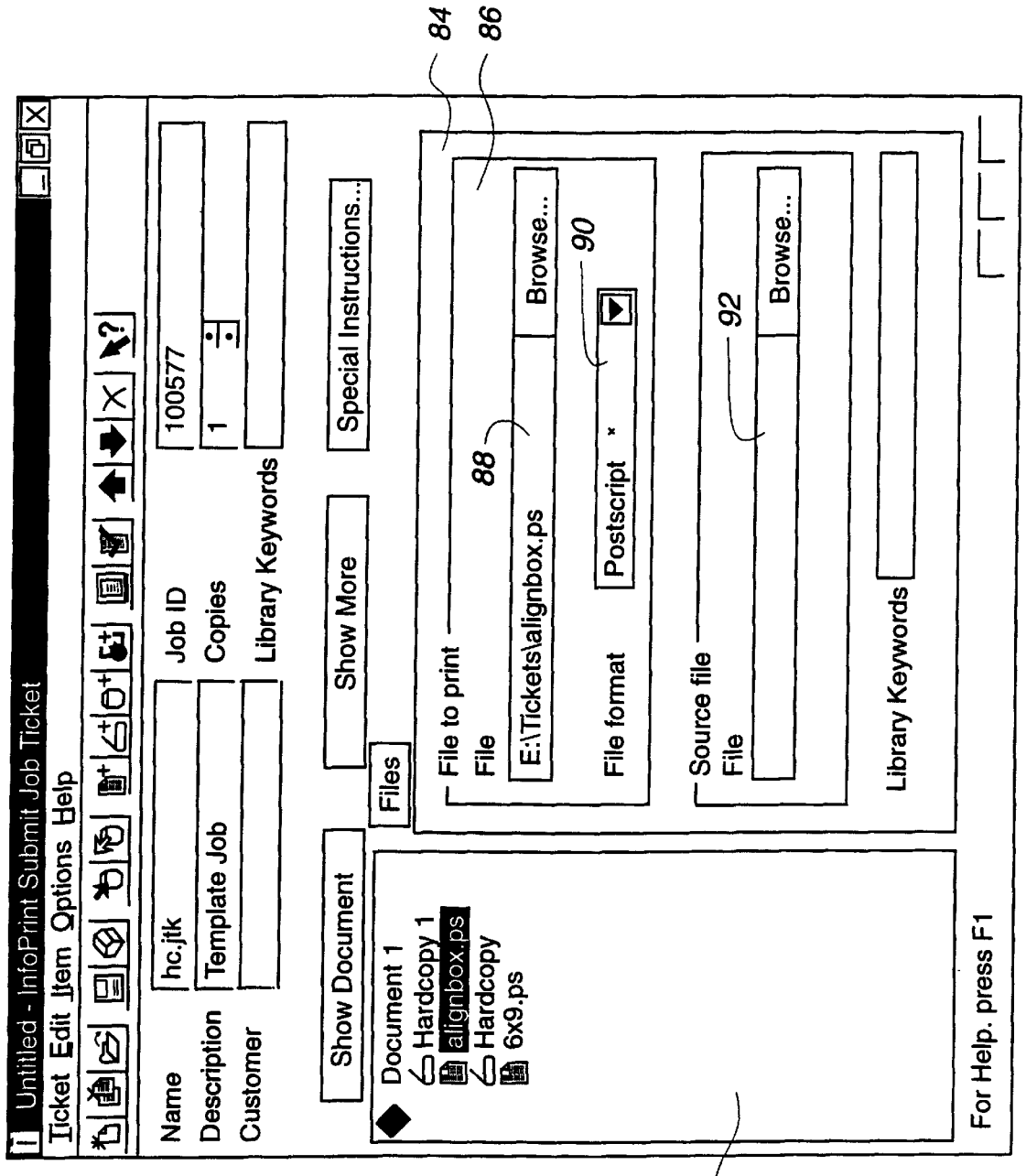

FIG. 10 shows the tree section 66 with two hardcopy items (Hardcopy 1 and Hardcopy 2) and two file items in PostScript format (alignbox.ps and 6×9.ps). The user may add, modify or delete elements from the tree section 66 using functions included in the Item and Edit main menu items. The Item submenu, shown in Table 1, includes functions which allow the user to add items, including files, hardcopies, library files, and variable data, and add documents. The user adds the hardcopy items using the Insert Hardcopy function and the PostScript file items using the Insert File function within the submenu of the Insert main menu item. The Edit submenu includes functions, shown in Table 1, which allow the user to modify the arrangement of the elements within the tree section 66, i.e., Move Up, Move Down, Remove, Delete.

FIG. 10 also shows a File attribute page 84 that appears when the user selects a particular file item with the mouse pointer. In FIG. 10, the user has selected the alignbox.ps file item. The file attribute page 84 allows the user to add information to the job ticket 40 on the location of the file item alignbox.ps and a source file from which the file item was generated. A file to print area 86 includes a File field 88 in which the user enters the location of the file item selected in the tree section 66, which in FIG. 8 is the directory path for the file "alignbox.ps." The user may enter the file location with a keyboard attached to the client computer 4a, b, c or the Browse radio button in the File to Print 84 area. The Browse radio button invokes a file manager GUI, such as is provided with the Microsoft Windows File Manager or Explorer programs. A file format field 90 indicates the format of the file item. This file format may be sniffed from the file name in the File field 88 or entered by the user. A source file field 92 provides the location of the original file from which the file item was generated. The user may enter the directory path for the source file in the source file field 84 using the keyboard or the Browse radio button.

Using the preferred embodiment of the present invention discussed above, the user may create a job ticket including documents and items, and set print attributes for the documents and items by selecting options in the print attribute pages 70a, b, c, d, e. As discussed, any setting at the document level within the tree section 66 applies to lower level items that branch from the document. There are primarily three ways to change the print attribute values available in the print attribute pages 70a, b, c, d, e. First, as discussed above, when a user selects a printer 28, 30, 31 or 32, the print attribute values reset to the values supported by the selected printer 28, 30, 31 or 32. Second, the InfoPrint Submit software 10 may occasionally query the InfoPrint MPC server 6 to obtain information on all the installed printers and printing options available. The InfoPrint Submit software would then modify the range of attribute values the user may select based on the information received from the InfoPrint MPC server 6 during the query. This process of querying the InfoPrint MPC server 6 to update printing options available on the client computer 4a, b, c is described in detail in the co-pending and commonly-assigned application Ser. No. xx/xxx,xxx, filed on same date herewith, by Deborah Elisabeth Neuhard, Robert Curt Nielsen, Dwight Ross Palmer, and Luana Vigil, entitled "Method For Customizing Print Attribute Choices Based On Selected Model, Media, And Printer," attorney's docket number AM9-97-102, which application was incorporated by reference above. Still further, the InfoPrint Submit software includes the feature of allowing attribute fields to be added, deleted or modified in the print attribute pages 140. Third, the user may modify, delete, and add print attribute fields to the print attribute pages 70a, b, c, d, e.

In the preferred embodiment of the GUI 60 as set forth in Tables 1–9, the GUI 60 does not include a function to create the part record 48, 50 discussed above. Users can only create document records 44, 50 and item records 52, 54. However, in alternative embodiments, the job ticket 40 could include part elements. In such case, one of the submenus for the main menu items would include a function for adding parts records to the job ticket 40, such as the parts 48, 50 discussed above with respect to the job ticket 40 embodiment of FIG. 2. Alternatively, a submenu may include a function for grouping items into a named part. Associated with each part record 48, 50 would be print attribute pages 70a, b, c, d, e which would include fields for the user to enter print attribute information for the part records 48, 50. As discussed, any print attribute information entered for the part records would apply to any item records grouped in the part record.

OPERATIONAL FLOWCHARTS

Figure 11:
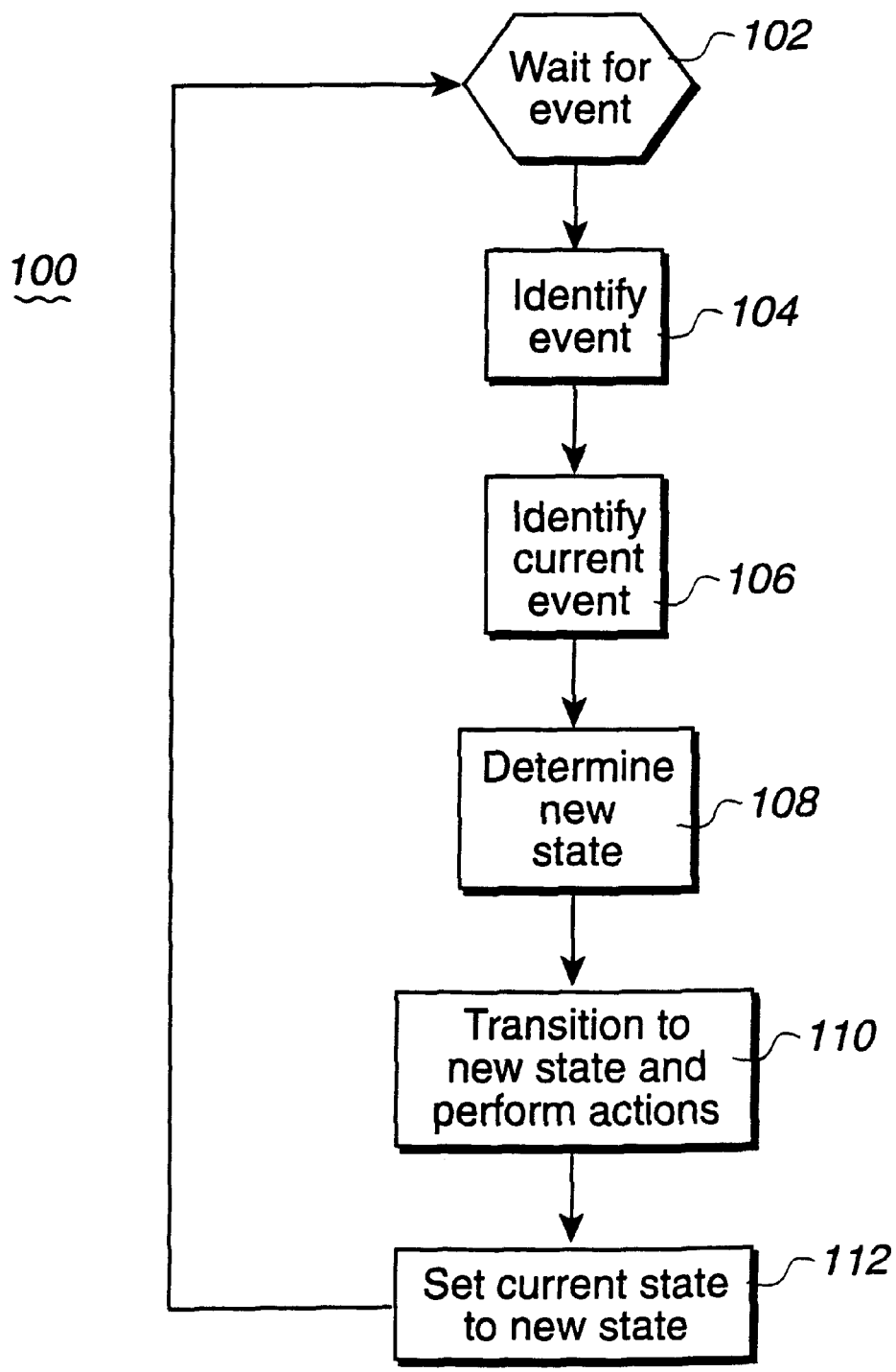
FIG. 11 is a flowchart that illustrates the general logic of a message or event-driven operating system and application program performing the steps of the present invention.

FIG. 11 is a flowchart that illustrates the general logic of the InfoPrint Submit software 10 according to the present invention. The InfoPrint Submit software 10 is event or message drive software, wherein operations are performed when transitions are made, based upon the receipt of messages or events, from present or current states to new states.

The general logic 100 begins by waiting at block 102 for an event (e.g., a mouse button click). It should be appreciated that during this time, other operating system tasks, e.g., file, memory, and video tasks, etc., may also be carried out. When an event occurs, control passes to block 104 to identify the event. Based upon the event, as well as the current state of the client computer 4a, b, c determined in block 106, a new state is determined in block 108. In block 110, the routine 60 transitions to the new state and performs any actions required for the transition. In block 112, the current state is set to the previously determined new state, and control returns to block 102 to wait for more input events.

The specific operations that are performed by block 100 when transitioning between states will vary depending upon the current state and the event. The various operations required to implement and maintain the present invention represent particular events handled by routine 100. However, it should be appreciated that these operations represent merely a subset of all of the events handled by any applications program or operating system.

Figure 12:
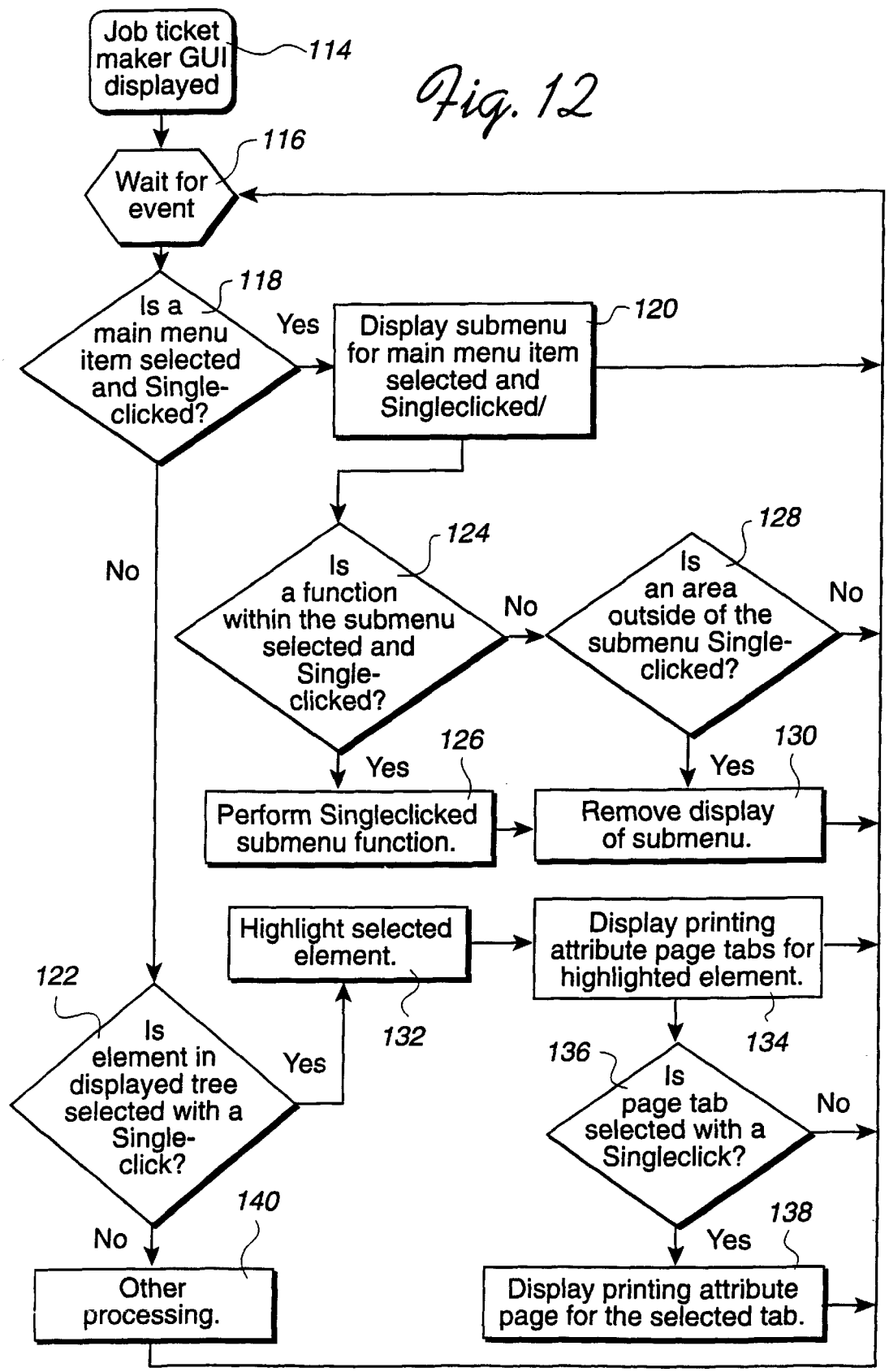
FIG. 12 is a flowchart that illustrates the general logic for a preferred embodiment of a routine performing the steps of the present invention.

FIG. 12 is a flowchart that illustrates more specific logic performed by the InfoPrint Submit software 10 when the GUI 60 is displayed as indicated at 114. The logic begins by waiting at block 116 for an event (e.g., a mouse button click signifying selection of a menu item). When an event occurs, control passes to blocks 118–139 to identify the events and perform associated functions.

Block 118 is a decision block that represents the client computer 4a, b, c determining whether a main menu item displayed on a main menu item bar 62 (FIG. 3) was selected and SingleClicked. If so, control transfers to Block 129; otherwise control transfers to block 122. Block 120 represents the client computer 4a, b, c displaying in the GUI 60 a submenu for the selected main menu item. From block 120, control transfers to block 124, which is a decision block that represents the client computer 4a, b, c determining whether a displayed function within the submenu was selected. If so, control transfers to block 126; otherwise control transfers to block 128. Block 126 represents the client computer 4a, b, c performing the selected submenu function. After performing the selected submenu function, control transfers to block 130, which represents the client computer 4a, b, c removing the display of the submenu. Block 128 is a decision block that represents the client computer 4a, b, c determining whether the user Single-Clicked on an area of the GUI 60 outside of the displayed submenu. If so, control transfers to block 130, which represents the client computer 4a, b, c removing the display of the submenu; otherwise control transfers back to block 116.

Block 122 is a decision block that represents the client computer 4a, b, c determining whether an element (document, part or item) displayed in a tree section 66 of the GUI 60 (FIG. 3) is selected with a SingleClick. If so, control transfers to block 132; otherwise control transfers to block 139. Block 132 represents the client computer 4a, b, c highlighting the selected element to indicate its selection. From block 132, control transfers to block 134, which represents the client computer 4a, b, c displaying print attribute page tabs 68a, b, c, d, e (FIG. 3) associated with the element highlighted at block 132. From block 134, control transfers to block 136, which is a decision block that represents the client computer 4a, b, c determining whether a print attribute page tab 68a, b, c, d, e was selected. If so, control transfers to block 138; otherwise control transfers back to block 116. Block 138 represents the client 4a, b, c displaying a print attribute page for the selected print attribute page tab 68a, b, c, d, e, which in the case of FIG. 3 is the Advanced print attribute page 70e. Block 139 represents the client computer 4a, b, c performing other processing.

The various functions associated with a SingleClick event are determined by the current state of the InfoPrint Submit software 10. In many instances, the current state is represented visually on the monitor connected to the client computer 4a, b, c.

It should be appreciated that there are a large number of states, events and operations that are associated with the InfoPrint Submit software 10. Generally, these various operations performed by the InfoPrint Submit software 10 can be classified within certain categories:

while in any mode, selecting a main menu item from the main menu item bar 62 to display a submenu of functions;

after selecting an element (document, part or item) within the tree section 66 of the GUI 60, selecting the Item or Edit main menu items to modify or edit the tree structure arrangement of elements;

after selecting an element within the tree section of the GUI 60, selecting a print attribute page tab 68a, b, c, d, e for the selected element; or after selecting a print attribute page tab 70a, b, c, d, e, entering print attribute information on the displayed print attribute page 70a, b, c, d, e.

In preferred embodiments, the various operations described above are specifically related to the InfoPrint Submit software 10. Of course, those skilled in the art will recognize that the use of the present invention with computer programs may result in different operations (or potentially the same operations).

Also in the preferred embodiment, the identifier Single-Click is intended to indicate a default single click action, which uses the left mouse button. Other mouse buttons are indicated through the use of appended identifiers, such as (RightMouseButton), etc.

Of course, those skilled in the art will recognize that the use of any mouse button, keyboard sequence, voice command, or other user input is merely a design choice, and the functions performed by the present invention could be invoked by any number of different combinations of mouse buttons, keyboard sequences, voice command, or any other user input.

HANDLING RASTER IMAGE PROCESS (RIP) FILES

The present invention further includes a method, apparatus, and article of manufacture for handling a RIP version of an item, e.g., file item, hardcopy item, library item, and variable data. As discussed, when printing files, a RIP version of the file must be generated from the file transmitted to the printer. In the preferred embodiment, the InfoPrint MPC server 6 includes the hardware and software to generate a RIP version of a file. However, in alternative embodiments the RIP hardware and software may be included in the printers 28, 30, 31, 32 or some other location within the network printing system 2.

Users would want to send the RIP version of an item to the printer instead of the item because it could take several hours to regenerate the RIP version. To keep track of the RIP version generated from an item, the item record 52, 54 includes information on the location and date of creation of the RIPI version of the item. In the preferred embodiment, the client computer 4a, b, c, operating under control of the InfoPrint Submit software 10, would use this information in the item record 52, 54 to submit the RIP version of the item to the InfoPrint MPC server 6 for printing instead of the selected item when the RIP version is more current than the item.

In a preferred embodiment, the user can use the GUI 60 to instruct the InfoPrint MPC server 6 to save the generated RIP version of items. In FIGS. 5a, b, the Print attribute page displays a field labeled "Save RIPed file." The user checks the box next to this field using the input device 12a, b, c to indicate that a RIP version should be saved for later use and submitted instead of the item. This "Save RIPed file" option is available for documents and all item types. If the "Save RIPed file" option is set for a document, then any RIP version of an item included in the document that is generated when the item is submitted for printing will be saved for later use. As discussed, the print attributes selected for a document record 44 apply to the item records 52, 54 within the document 44 record. If the "Save RIPed file" option is set for an item record, then any RIP versions generated for the item will be saved. The InfoPrint MPC server 6 saves the generated RIP versions of the item in a directory in the network printing system 2. The InfoPrint Submit software 10 would include a feature for the user to specify the directory where RIP versions of items are stored. Otherwise, a default directory could be used.

In preferred embodiments, a saved RIP version of an item is automatically submitted in lieu of the selected item unless the user specifies otherwise. Table 8 describes a preferred embodiment of a dialog box displayed in the GUI 60 which allows the user to manage the submission of RIP versions. When the user selects the Submit function in the Ticket submenu 80 to submit a document record 44 or item record 52 or 54 for printing, the user may select from the File and Schedule Pages, described in Tables 8 and 9, respectively. Selection of the File page displays a dialog box displaying two columns. One column contains the name of an item which is submitted for printing and the other column labeled "File to Print" lists the files that will be submitted for that item. If the user previously selected the "Save RIPed file" option for that item and a RIP version of the item was previously generated, then the File to Print column will list the RIP version of the item as the file that will be submitted for printing. Otherwise, the File to Print column will list the non-RIP version of the item, such as PostScript, TIFF, etc. The RIP version of the item will only be submitted if its date of creation is more current than the non-RIP version of the item. The dialog box further includes an option allowing the user to send the non-RIP version for all the items or for selected items. If the user selects the option to send the non-RIP version of the item, then a RIP version will have to again be generated for that item. As discussed, for desktop printing jobs, this can take several hours.

Figure 13:
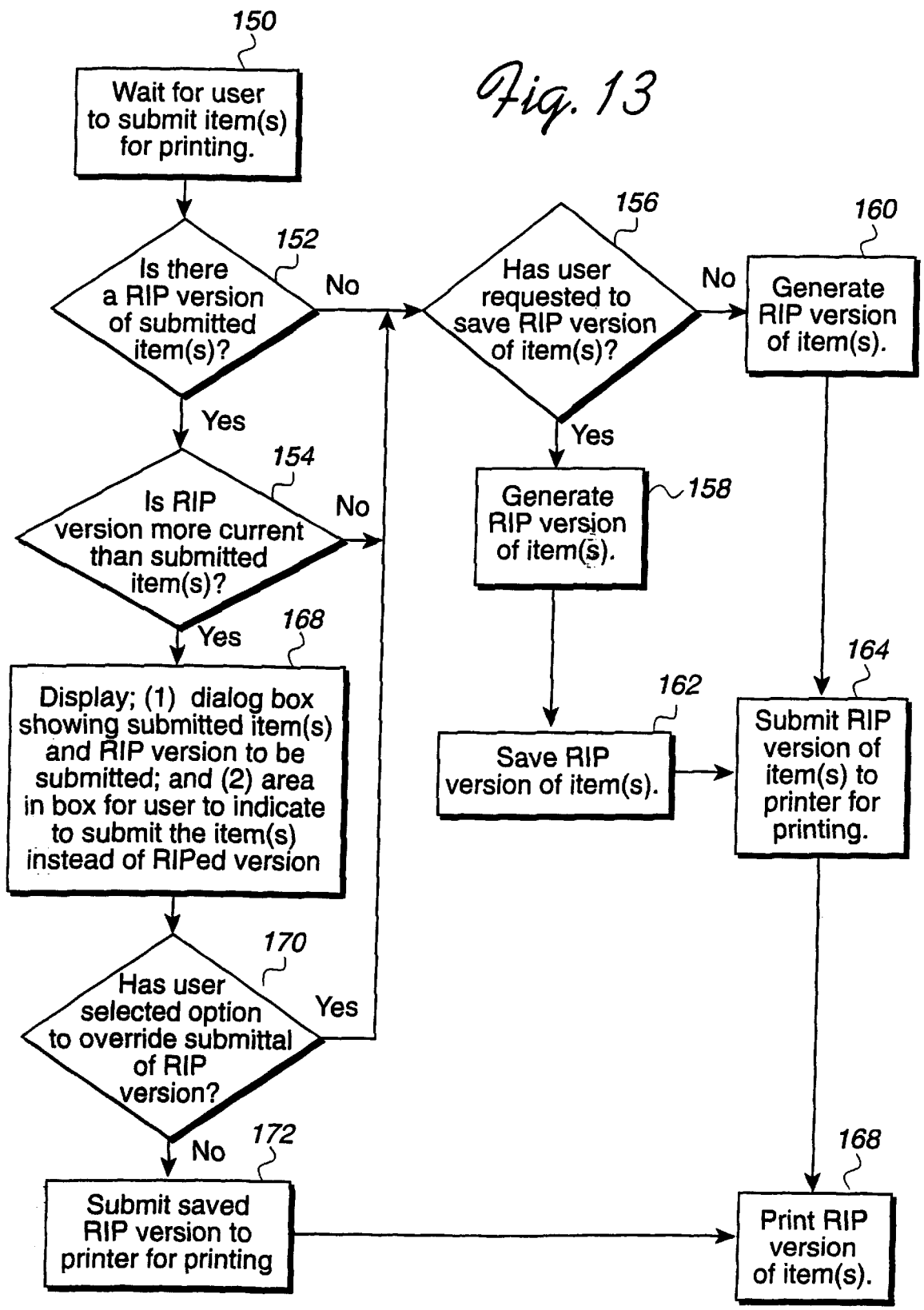
FIG. 13 is a flowchart that illustrates the general logic for a preferred embodiment of a routine that organizes RIP files in accordance with the present invention.

FIG. 13 is a flowchart that illustrates the logic of a preferred embodiment of a routine implemented in the InfoPrint Submit software 10 for handling RIPed files in accordance with the present invention. The logic begins at block 150 which represents the client computer 4a, b, c, operating under control of the InfoPrint Submit software 10, waiting for the user to submit an item record 52 or 54 or a document record 44 including item records 52, 54 for printing. From there control proceeds to block 152 which represents the client computer 4a, b, c determining whether there is a RIP version of the submitted item(s) in the directory containing the RIP files. If so, then control proceeds to block 154; otherwise block 156. Block 156 represents the client computer 4a, b, c determining whether the user has previously requested to save RIP version of the item(s) selected for printing. If so, control proceeds to block 158; otherwise block 160. Block 158 represents the Info-Print MPC server 6 generating a RIP version of the item(s). From block 158, control proceeds to block 162 which represents the InfoPrint MPC server 6 saving the RIP version of the item(s). From block 162, control proceeds to block 164 which represents the InfoPrint MPC server 6 submitting the RIP version to the printer for printing at block 166. Block 160 represents the InfoPrint MPC server 6 generating a RIP version of the item(s). From block 160, control proceeds to block 164 and then block 166.

If at decision block 152, the client computer 4a, b, c determined that there is a RIP version of the item, then control proceeds to block 154. Block 154 is a decision block representing the client computer 4a, b, c determining whether the RIP version of the item is more current than the item, i.e., the item has not been modified since the RIP version was generated. If so, control proceeds to block 168; otherwise back to block 156. Block 168 represents the client computer 4a, b, c displaying on the monitor 14a, b, c a dialog box presenting the item(s) the user submitted and the RIP version, if available, to be submitted. Also displayed is a dialog box in which the user may select to submit the non-RIP version of the item instead of the RIP version. Block 170 is a decision block representing the client computer 4a, b, c determining whether the user has selected the option to submit the item instead of the RIP version of the item. If the user does not make this selection, then the client computer 4a, b, c will by default submit the RIP version of the item for printing. If so, control proceeds back to block 156; otherwise control proceeds to block 172. Block 172 represents the client computer 4a, b, c submitting the saved RIP version of the item to the printer for printing.

CONCLUSION

This concludes the description of the preferred embodiments of the invention. The following describes some alternative embodiments for accomplishing the present invention.

For example, the client computer 4a, b, c and InfoPrint MPC server 6 may be any type of computer, such as a mainframe, minicomputer, work station, personal computer or combinations thereof operating under any suitable operating system. In addition, the client computer 4a, b, c may include any software program, application or operating system having a graphical user interface and performing the operations of the present invention. Still further, some or all of the functions described above as being performed by the client computer 4a, b, c could, in alternative embodiments, be performed by the InfoPrint MPC server 6, and vice versa.

Those skilled in the art will also recognize that the GUI and data structure may be modified to accommodate different types of print attributes other than those described above. Still further, the GUI may have a different appearance, layout and design then the GUI described above.

Still further, those skilled in the art will recognize that in the flowcharts set forth in FIGS. 11–13, programming steps may be added, modified, deleted or performed in an order different than the order set forth in the preferred embodiments.

In summary, the present invention discloses a method, apparatus, and program for organizing files associated with a job ticket, including raster image process (RIP) files. The files and job ticket are in a storage device attached to a computer system. A job ticket is created including information on a plurality of print files included in a print job, print file location information indicating a location of the print files in the storage device, and RIP file location information indicating a location of a RIP version of a print file in the storage device. The print files include data representing graphical images and the RIP version is generated from the print file. The submission of the job ticket for printing involves accessing a print file in the location indicated in the print file location information and determining whether there is a RIP version of the accessed print file. Upon determining that there is a RIP version of the accessed print file, the RIP version is transmitted from the location indicated in the RIP file location information to a printer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

TABLE I

SUBMENUS OF MAIN MENU ITEMS

| Ticket | Edit | Item | Options | Help |
|---|---|---|---|---|
| New. . . | Undo | Insert File. . . | Print Job Status. . . | Contents |
| New Like. . . | — | Insert Hardcopy | — | About. . . |
| Open. . . | Cut | Insert Library file. . . | Refresh Lists | |
| — | Copy | Insert Variable Data. . . | — | |
| Save | Paste | — | Setup. . . | |
| Save As. . . | — | View | Preferences. . . | |
| Package. . . | Move Up | Preflight | Papers. . . | |
| — | Move Down | — | | |
| Archive. . . | Rename | Add Document | | |
| Retrieve. . . | Remove | | | |
| — | Delete | | | |
| Submit Job. . . | | | | |
| Print Ticket. . . | | | | |
| Printer Setup. . . | | | | |
| — | | | | |
| previous job tickets | | | | |
| — | | | | |
| Exit | | | | |

TABLE 2

DESCRIPTION AND BEHAVIOR OF MAIN MENU ITEM FUNCTIONS

| Menu | Item | Available | Behavior |
|---|---|---|---|
| Ticket | New | Always | Clears all fields in the window including the general attributes and the tree view. Changes Name field to Untitled and marks (selects) it. |
| | New Like . . . | Always | Opens the standard Open dialog. Set Files of type field to Job Ticket Files. When a job ticket is selected, it is opened with the Name field set to Untitled (and marked) and the Job ID field cleared. |
| | Open . . . | Always | Opens the standard Open dialog. Set Files of type field to Job Ticket Files. If file name does not match the job name, change the value of the job name. |
| | Save | Always | Saves the current job ticket. If the job has not been saved before, open the standard Save As directory. Show the directory specified in Preferences as the default directory. Set the file name to the job name. If it is saved as a different name, change the job name in the ticket to match the new name. If the name is a duplicate name, open the standard Do You want to Replace? Dialog. |
| | Save as . . . | Always | Opens the standard Save As dialog. The Save as type field defaults to job ticket type. If this ticket has not been saved before, default the directory to the directory specified in Preferences. The directory for changes based on the Save as type and the directories specified in Preferences. Set the file name to the job name. If it is saved as a different name, change the job name in the ticket to match the new name. If the name is a duplicate name, open the standard Do You want to Replace? Dialog. |
| | Package . . . | Always | Open Select Directory dialog (Alex's). The job ticket, and all the files associated with this job ticket are saved in the directory. If any files reside in the Library, they are copied to this directory. If any files have .pdf or .rip associated with them, they are copied to this directory. |
| | Archive . . . | Job is saved and Library is installed | Packages the job ticket and its files and archives the job. If the job is displayed in the status window, update the status. |
| | Retrieve . . . | Job is saved and Library is installed | Opens the Logon dialog if this is the first invocation of Library. Then opens the Retrieve Ticket dialog. When the ticket is selected from the Library, a new job ticket is created. The Name is set to Untitled (and marked), the Job ID is cleared, and the tree is filled with references to the Library shared directory. |
| | Submit Job . . . | Always | Opens the Submit dialog. If there are no items in the tree, put up a message. |
| | Print Ticket . . . | Always | Opens the standard Print dialog. Prints the formatted job ticket. |
| | Printer Setup . . . | Always | Opens the standard Print Setup dialog. |

TABLE 2-continued

DESCRIPTION AND BEHAVIOR OF MAIN MENU ITEM FUNCTIONS

| Menu | Item | Available | Behavior |
|---|---|---|---|
| | previous job tickets | Always | Lists the previous X job ticket file names where X is specified in the Preferences Dialog. |
| | Exit | Always | Closes the job ticket window. If the current job ticket file has changed from the last time it was saved, prompt the user to save the file. |
| Edit | Undo | After a cut or a paste | Undoes cut or paste. |
| | Cut | Always | Cuts the selected item, part or document to the clipboard. |
| | Copy | Always | Copies the selected item, part or document to the clipboard. |
| | Paste | After a Cut or Copy | Pastes the item to the current position in the tree. |
| | Move up | Item, Part or Document is selected and item is not the first item | Moves the selected item before the previous item that's at the same level. |
| | Move down | Item, Part or Document is selected and item is not the last item | Moves the selected item after the next item that's at the same level. |
| | Rename | Always | Puts the standard edit box around the selected item in the tree. If the item is a file, the file to print is not renamed, just the item in the tree. If the file is a Library Reference, the file to print is not renamed, just the item in the tree. |
| | Remove | Always | Removes the selected item from the tree. If the only document is selected, removes all the items for that document, but leaves the document in the tree. |
| | Delete | Only disabled when a Library Reference is selected. | Opens a prompt confirming deletion of the item. Document - Prompt for all items in document. All items and document will be deleted. If this is the only document in the tree, the items will be deleted, but the Document level will still be in the tree/ticket. Delete associated files (RIP files and PDF files) File - Prompt for the file. The file will be deleted and removed from the tree/ticket. Delete associated files (RIP files and PDF files) Library Reference - Can't do it. Variable Data - Prompt for all files relating to this item. The files will be deleted and the item will be deleted from the ticket/tree. Delete associated files (RIP files and PDF files) Hardcopy - Prompt for all 10 files relating to this item. The files will be deleted and the item will be deleted from the ticket/tree. Delete associated saved RIP files. |
| Item | Insert file . . . | Always | Opens the standard Open dialog listing the allowed filetypes (see sniffed file types). Replace Open button with Insert button. After file is selected, the new file item is added to the Tree View following the currently selected item. The item displays the fully qualified file name and the File attribute pages are shown. |
| | Insert hardcopy | Always | The item Hardcopy X is added to the Tree View following the current item and the hardcopy attribute pages are shown. X starts at 1 and increments for every hardcopy item in the job. |
| | Insert library file . . . | Library is installed | Opens the Library Logon dialog (only the first time). If the file is saved, the fully qualified file name is added the Tree view following the current item. If the file is referenced, the Tree view is updated with the filename. The file attribute pages are shown. |
| | Insert variable data | Disable after one variable data item is added to the tree (there can only be 1 variable data item in a ticket). | The item Variable Data X is added to the Tree view following the current item and the variable data attribute pages are shown. X starts at 1 and increments for every variable data item in the job. |
| | Preflight | When selected file is a PostScript file | Opens Preflight Dialog. |
| | View | Always | Opens the viewer for the selected item as specified in the Preferences dialog. If this is a PostScript file, and a PDF does not already exist, open the Preflight dialog. |
| | Add document | Always | Adds a Document X following the current document. If no items are selected, the item is added to the bottom of the list. X starts at 1 and increments for every document in the job. |

TABLE 2-continued

DESCRIPTION AND BEHAVIOR OF MAIN MENU ITEM FUNCTIONS

| Menu | Item | Available | Behavior |
|---|---|---|---|
| Options | Print job status . . . | Always | Opens the Print Job Status dialog. |
| | Refresh lists | Always | Queries for Logical printers and for Papers. Refreshes those drop down lists. |
| | Setup . . . | Always | Opens the Setup dialog. |
| | Preferences . . . | Always | Opens the Preferences dialog. |
| | Papers . . . | Always | Opens the Papers dialog. |
| Help | Contents | Always | Opens WinHelp to the Contents page. For Mac, it opens Netscape with the contents of the page loaded. |
| | About . . . | Always | Opens the About box. |

TABLE 3

| Selected Tree Item | Attribute Pages Shown |
|---|---|
| Document | Layout |
| | Print |
| | Align |
| | Look |
| | Advanced |
| File | File * |
| | Print |
| | Align |
| | Look |
| | Advanced |
| Library Reference | File * |
| | Print |
| | Align |
| | Look |
| | Advanced |
| Hardcopy | Scan Files * |
| | Hardcopy * |
| | Print |
| | Align |
| | Look |
| | Advanced |
| Variable Data | Variable Data * |
| | Referenced Files * |

TABLE 3-continued

| Selected Tree Item | Attribute Pages Shown |
|---|---|
| | Print |
| | Align |
| | Look |
| | Advanced |

TABLE 4

DESCRIPTION OF ATTRIBUTES IN THE LAYOUT ATTRIBUTES PAGE AND BEHAVIOR OF ATTRIBUTES

DESCRIPTION OF THE LAYOUT ATTRIBUTES

| pd attribute | Label | Control | Values | Operations Default |
|---|---|---|---|---|
| sides, plex | Sides | drop down list | Simplex, Duplex, Tumble, Use server default | Duplex |
| output-format | Layout | drop down list | Side by side copies, Slit and merge, Booklet, No adjustment, Use server default | Side by side copies |
| number-up | Number up | drop down list | 1, 2, 3, 4, Use server default | 2 |
| form-definition | Use form definition | check box with entry field following label | 8 alphabetic characters | unchecked |
| | Calculate number of pages | check box | | checked at document level. |
| job-page-count | Number of pages | entry field with spin box | 0–999999 | For an item, blank For a Document, totaled from items when box is checked. |

BEHAVIOR OF THE LAYOUT ATTRIBUTES

| Label | Available | Behavior |
|---|---|---|
| Sides | Disable when Booklet (set to | simplex: set sides = 1 plex = simplex |

TABLE 4-continued

DESCRIPTION OF ATTRIBUTES IN THE
LAYOUT ATTRIBUTES PAGE AND BEHAVIOR OF ATTRIBUTES

|  |  |  |
|---|---|---|
|  | duplex) and disable when Form Def specified | duplex: set sides = 2 plex = simplex<br>tumble: set sides = 2 plex = tumble<br>Use server default: do not send sides or plex<br>Updates bitmap |
| Layout | Always | Updates bitmap<br>Disable Number up when Slit and merge or No Adjustments.<br>Set Sides to Duplex and disable Sides when Booklet. |
| Number up | Disable when Layout is Slit and merge or No Adjustment or Use server default<br>Disable when Use Form Definition is checked | Updates bitmap |
| Use form definition | Disabled on item level.<br>At Document level, disabled for IC 70. | When a file is not specified, the file defaults to what is specified in the IVD. This file resides on the server. Disables the following:<br>Sides, at an item level<br>Layout choices Side by side copies and Booklet<br>Number up<br>Paper, at an item level<br>Rotation<br>Align page |
| Calculate number of pages | Disabled at item level | If this box is checked, at the document level total the number of pages for each item. |
| Number of pages | Disabled at item level | job-page-count is only set at the document level. |

TABLE 5

DESCRIPTION OF ATTRIBUTES IN
PRINT ATTRIBUTES PAGE AND BEHAVIOR OF ATTRIBUTES

DESCRIPTION OF PRINT ATTRIBUTES

| pd attribute | Label | Control | Values | Default |
|---|---|---|---|---|
| printer-models-requested | Printer type | drop down list | InfoPrint 4000<br>InfoPrint 60<br>Any black and white<br>InfoColor 70 | InfoPrint 4000 |
| default-printer-resolution |  |  |  | 600 |
| default-medium<br>default-input-tray | Paper | drop down list | list from query of supported media, list of checked trays in Preferences, Use server default | first in list |
| start-on-new-sheet | Start on a front facing page | check box |  | unchecked |
| transform-output-file-name | Save RIPed file | checkbox |  | unchecked |

BEHAVIOR OF PRINT ATTRIBUTES

| Label | Available | Behavior |
|---|---|---|
| Printer type | Read-only at item level | IP 4000 - sets Calibrate for field on Look page. Disables the following:<br>Tray paper choices.<br>No adjustment Layout choice.<br>Paper, at an item level<br>IP 60 - Sets Calibrate for field on Look page. Disables the following:<br>Slit and merge Layout choice.<br>Insert Variable Data menu item.<br>Any B&W - Defaults Calibrate for field on Look page to Server default.<br>Disables the following:<br>Tray paper choices.<br>Slit and Merge and No adjustment choices for Layout choices.<br>Insert Variable Data menu item.<br>Paper, at an item level<br>IC 70 - Disables the following:<br>Tray paper choices<br>Paper, at an item level<br>Align page<br>Look page<br>Advanced page<br>Form definition field |

TABLE 5-continued

DESCRIPTION OF ATTRIBUTES IN
PRINT ATTRIBUTES PAGE AND BEHAVIOR OF ATTRIBUTES

|  |  |  |
| --- | --- | --- |
|  |  | Save RIPed file field |
|  |  | RIP Options in Print Submit |
|  |  | General Options in Print Submit |
|  |  | Use RIP button in Print Submit |
|  |  | Stacker in Print Submit |
|  |  | Separator Sheets in Print Submit |
| Paper | Disabled at item level when: Use Form Definition is checked on Layout page. IP 4000 or Any B& W | If a tray is specified, set default-input-tray and use appropriate paper size for Align page. Otherwise, set default-medium and use default untrimmed page size from the media object for Align page. |
| Start on front facing page | Always |  |
| Save RIPed file | Disabled for IC 70 | If checked, set transform-output-file-name to the jobname in the directory specified in the job ticket. The directory is determined by the shared directory specified in the Setup dialog. |

TABLE 6

DESCRIPTION OF ATTRIBUTES IN THE ALIGN
ATTRIBUTES PAGE AND BEHAVIOR OF ALIGN ATTRIBUTES

DESCRIPTION OF THE ALIGN ATTRIBUTES

| pd attribute | Label | Control | Values | Default |
| --- | --- | --- | --- | --- |
|  | Page Content | Groupbox with Rotation drop down and Trim and Scale radio buttons |  |  |
| content-orientation | Rotation | drop down list | None, 90° clockwise, 180°, 90° counterclockwise, Use server default | None |
| image-fit | Trim to unfinished page size | radio button |  | on |
|  | Scale to unfinished page size | radio button |  | off |
|  | Unfinished page size | Groupbox with Length and Width |  |  |
|  | Length | spinbox | numbers | If Paper is a media-supported, get this information from the media object. If the object information is blank, use the default set in Preferences. If this is a tray, use the default set in Preferences for the selected tray. |
|  | Width |  |  |  |
|  | Finished page size | Groupbox with Length, Width |  |  |
| image-length | Length | entry field with spin box | page size | default to untrimmed page size |
| image-width | Width |  |  |  |
| x-image-shift x-image-shift-back y-image-shift y-image-shift-back | Page placement | drop down list | Upper left, Upper right, Upper middle, Center left, Center middle, Center right, Lower left, Lower middle, Lower right, Other | Upper left |

TABLE 6-continued

DESCRIPTION OF ATTRIBUTES IN THE ALIGN
ATTRIBUTES PAGE AND BEHAVIOR OF ALIGN ATTRIBUTES

| | Show placement | pushbutton | |
|---|---|---|---|

BEHAVIOR OF THE ALIGN ATTRIBUTES

| Label | Available | Behavior |
|---|---|---|
| Rotation | Always* | Shows image rotated in Placement dialog. |
| Trim to unfinished page size | Always* | sets image-fit to id-val-image-fit-position-and-trim |
| Scale to unfinished page size | Always* | sets image-fit to id-val-image-fit-scale-to-fit |
| Unfinished page size | Always* | Use this value to determine the offsets and in the Placement dialog. Use the units that are specified in Preferences. |
| Finished page size | Always* | Use this value to determine the offsets and in the Placement dialog. Use the units that are specified in Preferences. |
| Page placement | Always* | Use this value to set the offsets displayed in the Placement dialog. This value is updated based on the Placement dialog. Note: Other is used when additional shifting has been performed. |
| Show placement | Always* | Opens the Placement dialog. |

*Note:
This tab is disabled when Printer type is IC 70 or when Use Form Definition is checked.

TABLE 7

DESCRIPTION OF ATTRIBUTES IN
LOOK ATTRIBUTES PAGE AND BEHAVIOR OF ATTRIBUTES

DESCRIPTION OF THE LOOK ATTRIBUTES

| pd attribute | Label | Control | Values | Default |
|---|---|---|---|---|
| output-appearance | Output appearance | drop down list | Use server default Standard Highlight midtones Dark Custom . . . | Use server default |
| base-printer | Calibrate for | drop down list | Use server default, InfoPrint 4000, InfoPrint 60 | set to value of Printer type. If Printer type is Black and white, set to server default and disable. |
| screen-frequency | Screen frequency | drop down list | Use server default, 71,85,106 | Use server default |
| scanner-correction | Scanner correction | editable drop down list | Use server default, Xerox DocuImage 620S, None | TIFF - Server default Hardcopy Item - Server default Otherwise - None |

BEHAVIOR OF THE LOOK ATTRIBUTES

| Label | Available | Behavior |
|---|---|---|
| Output appearance | Always* | When custom is selected, pop-up a prompt for the name of the custom output appearance file. When this window closes, put the value in this field. |
| Calibrate for | Disabled for Any B& W (and set to server default)* | |
| Screen frequency | Always* | |
| Scanner correction | Always* | |

*NOTE:
This page is not shown for the IC 70.

TABLE 8

FILES PAGE

Description

| pd attribute | Label | Control | Values | Default |
| --- | --- | --- | --- | --- |
| printer-name-requested | Printer | drop down list | displays all logical printer values that can submit jobs to the printer specified by Printer Type | first in the list |
| job-client-id | Print job ID | read-only field | job ID plus submit count(.00x). If the job ID is blank, use jobname. | same as value |
| results-profile job-copies | Copies to print | spin box increments by 10 | 1 . . . 99999 | number of copies specified in job ticket |
| optimize-for-multiple-copies | Proof | checkbox | | unchecked |
| job-page-count | Pages to print | spinbox | 1–999999 | total number of pages for checked items. |
| auxiliary-sheet-selection | Separator sheet | Group box with checkboxes for Start, Slipsheet and End | | Slipsheet checked |
| output-bin | Stacker | drop down list | Base, Side | Side |
| | Files to print | list box with 2 columns labeled Item, and File to Print. Each item in the item column has a checkbox. | Item column All items from the current document are listed. The selected item is checked. File to Print column include the file created date (for both RIP and Files: fully qualified filename or filename.rip when file has already been RIPed. Hardcopy: x TIF files or x RIPed files Library: fully qualified filename or filename.rip when file has already been RIPed. Variable data: name of document definition file or docdef.rip. | files in currently selected item are checked. |
| | Check all | pushbutton | | |
| | Uncheck all | pushbutton | | |
| | ReRIP all | pushbutton | | |
| | ReRIP selected | pushbutton includes checked | | |

Behavior

| Label | Available | Behavior |
| --- | --- | --- |
| Printer | Always | Displays all logical printers that submit jobs to printers of the specified type. When the printer type is All Black and White printers, list all logical printers that send jobs to the IP 60 or the IP 4000. |
| Print job ID | read-only | The submit count starts at .001 for a new or new like job and is incremented for every submission of any part of this job ticket. If no job ID is specified, use the jobname. |
| Copies to print | Always | From the general attributes on the job ticket. Note: this value prints on the header sheet. Save value for next invocation of dialog. |
| Proof | Always | Set Copies to print to 1 (but allow to be changed). For IP 4000, set optimize-for-multiple-copies to false. When this field is unchecked, reset the value to the value from the general attributes on the job ticket (and for IP 4000, set optimize-for-multiple-copies to true). Value not saved for next invocation of dialog. |
| Pages to Print | Always | Update whenever an item is checked or unchecked until Pages to Print is manually changed. |
| Separator | Disable for IC 70 | Values are start, sep, end. When multiple boxes are checked, |

TABLE 8-continued

FILES PAGE

| | | |
|---|---|---|
| Sheets | | append the appropriate value. For example when Start and Slipsheet are checked the value is start-sep. When Slipsheet and End are checked, the value is sep-end. |
| Stacker | Disable for IC 70 Disable for IP 60 | |
| Item column | Always | List all items in current document. Check the currently selected item. If the document is currently selected, check all items. |
| Files to print column | Always | If the .rip file exists for an item and it is newer than the item's file, use the .rip file as the file to print. If the .rip file is older than the item's file, use the item's file as the file to print. If printing .pdf files will be supported and the Print PDF file option is checked in the Preferences dialog, use the .pdf file when the .rip file does not exist or is older than the .pdf or item file and the .pdf is newer than the item's file. This column should also include information about the creation or modification date of the file to print. Note: When the printer type is IC 70, this column always shows the item's file. |
| Check all | Always | Checks all the items |
| Uncheck all | Always | Unchecks all the items |
| ReRIP all | Disabled for IC 70 | Changes the file to print for all items to be the item's file. |
| ReRIP selected | Disabled for IC 70 | Where the RIP file exists, changes the file to print for the selected items to be the item's file. |

TABLE 9

SCHEDULE PAGE

Description

| pd attribute | Label | Control | Values | Default |
|---|---|---|---|---|
| job-rip-action | RIP Options | Group box with radio buttons | | Use server default |
| job-hold | Use server default Hold RIP only RIP then hold Print | | | |
| job-priority job-complexity | General | Group box | | |
| | Priority | entry field with spin box | 1–10 | 5 |
| | Complexity | entry field with spin box | 1–10 | 1 |
| job-retention-period | Save job at server | Group box | January–December | Do not save at server |
| job-retain-until | Do not save at server | Radio button | | |
| | Save for | Radio button with entry field and drop down list | | 1 Day |
| | Save until | Radio button with month drop down list | | current month |
| | | day drop down list | # days in the month | current day |
| | | year drop down combo | any future year | current year |
| | Time | hours drop down list | 0:00–23:00 (whole hours only) | 23:00 |
| job-deadline-time | Print by | Group box check box | | unchecked |
| | | month drop down list | January–December | current month |
| | | day drop down list | # days in the month | current day |
| | | year drop down combo | any future year | current year |
| | Time | hours drop down list | 0:00–23:00 (whole hours only) | 23:00 |

TABLE 9-continued

SCHEDULE PAGE

| | | Behavior |
|---|---|---|
| Label | Available | Behavior |
| RIP Options | Disabled for IC 70 | Use server defaults - do not send job-rip-action or job-hold<br>Hold - set job-hold=true and job-rip-action=rip-and-print<br>Otherwise - setjob-rip-action to setting indicated by radio button and set job-hold=false |
| General | Disable for IC 70 | set job-priority to value * 10<br>set job-complexity to value in spin box |
| Save job at server | Always | |
| Do not save at server | Always | Do not send job-retention-period or job-retain-until.<br>Disable For and Until date/time fields. |
| Save for | Date/time fields disabled when For is not selected | Enable date/time fields. Send value for job-retention-period. If days is set, multiply value by 24 before sending. |
| Save until | Date/time fields disabled when Until is not selected | Enable date/time fields. Send value for job-retain-until. |
| Print by | Always | Enable date/time fields when checked. Disable date/time fields when not checked. Send job-deadline-time to values specified din date/time fields. |

What is claimed is:

1. A method of organizing files associated with a job ticket, including Raster Image Processor (RIP) files, wherein the files and job ticket are in a storage device attached to a computer system, comprising the steps of:
   (a) creating a job ticket, wherein the job ticket includes:
      (1) information on a plurality of print files included in a print job, wherein the print files include data representing graphical images;
      (2) print file location information indicating a location of the print files in the storage device; and
      (3) RIP file location information indicating a location of a RIP version of a print file in the storage device, wherein the RIP version is generated from the print file;
   (b) submitting the job ticket for printing, including the steps of:
      (1) accessing a print file in the location indicated in the print file location information;
      (2) determining whether there is a RIP version of the accessed print file; and
      (3) transmitting the RIP version of the accessed print file from the location indicated in the RIP file location information to a printer upon determining that there is a RIP version of the accessed print file.

2. The method of claim 1, wherein the step of submitting the job ticket further includes the step of determining whether the RIP version was modified after the accessed print file was modified upon determining that there is a RIP version of the accessed print file; and wherein the step of transmitting the RIP version occurs upon determining that the RIP version was modified after the accessed print file was modified.

3. The method of claim 2, further including the steps of:
   generating a RIP version from the accessed print file upon determining at least one of the following: (1) that the RIP version was modified before the accessed print file was modified and (2) that there is no RIP version of the print file in the storage device; and
   transmitting the RIP version to the printer upon generating the RIP version from the accessed print file.

4. The method of claim 3, wherein the computer system is comprised of a first computer, a second computer, and a network linking the first computer, the second computer, the printer, and the storage device, wherein the first computer performs the steps of creating the job ticket and submitting the job ticket for printing, and wherein the second computer performs the steps of generating the RIP version and transmitting the RIP version to the printer upon generating the RIP version.

5. The method of claim 3, further comprising the steps of:
   saving the RIP version in the storage device after generating the RIP version from the accessed print file; and
   indicating a location of the generated RIP version in the storage device in the RIP file location information.

6. The method of claim 1, wherein the print file is in a format which is a member of the set of formats comprising PostScript, TIFF, PDF, and PCL.

7. The method of claim 1, wherein the storage device is comprised of a first storage device and a second storage device linked to the computer system, wherein the print file is stored in the first storage device and the RIP version of the print file is stored in the second storage device.

8. The method of claim 1, further comprising the step of determining whether a user has indicated to not submit the RIP version of the print file in the location indicated in the location information, and wherein the step of transmitting the RIP version does not occur if the user has indicated to not submit the RIP version.

9. The method of claim 8, wherein a monitor and input device are attached to the computer system, and wherein the step of determining whether the user indicated to not submit the RIP version further comprises the step of displaying a field on the monitor in which the user indicates with the input device whether to not submit the RIP version of the print file in the location indicated in the RIP file location information.

10. The method of claim 9, wherein the step of determining whether the user indicated to not submit the RIP version, further comprises the steps of:
   displaying on the monitor information on the accessed print files included in the print job; and
   displaying on the monitor information indicating whether to submit the RIP version of the print file in the location indicated in the RIP file location information to the printer.

11. The method of claim 10 wherein the information is displayed in a GUI displayed on the monitor.

12. A computer programming apparatus, comprising:
   (a) a computer system having a memory;
   (b) a storage device attached to the computer system;
   (c) means, performed by the computer system, for creating a job ticket, wherein the job ticket includes:
      (1) information on a plurality of print files included in a print job, wherein the print files include data representing graphical images;
      (2) print file location information indicating a location of the print files in the storage device; and
      (3) Raster Image Processor (RIP) file location information indicating a location of a RIP version of a print file in the storage device, wherein the RIP version is generated from the print file;
   (b) means, performed by the computer system, for submitting the job ticket for printing, including:
      (1) means for accessing a print file in the location indicated in the print file location information;
      (2) means for determining whether there is a RIP version of the accessed print file; and
      (3) means for transmitting the RIP version of the accessed print file from the location indicated in the RIP file location information to a printer upon determining that there is a RIP version of the accessed print file.

13. The apparatus of claim 12, wherein the means for submitting the job ticket further includes means for determining whether the RIP version was modified after the accessed print file was modified upon determining that there is a RIP version of the accessed print file; and wherein the means for transmitting the RIP version transmits the RIP version upon determining that the RIP version was modified after the accessed print file was modified.

14. The apparatus of claim 13, further including:
   means, performed by the computer system, for generating a RIP version from the accessed print file upon determining at least one of the following: (1) that the RIP version was modified before the accessed print file was modified and (2) that there is no RIP version of the print file in the storage device; and
   means, performed by the computer system, for transmitting the RIP version to the printer upon generating the RIP version from the accessed print file.

15. The apparatus of claim 14, wherein the computer system is comprised of a first computer, a second computer, and a network linking the first computer, the second computer, the printer, and the storage device, wherein the first computer includes the means for creating the job ticket and submitting the job ticket for printing, and wherein the second computer includes the means for generating the RIP version and transmitting the RIP version to the printer upon generating the RIP version.

16. The apparatus of claim 14, further comprising:
   means, performed by the computer system, for saving the RIP version in the storage device after generating the RIP version from the accessed print file; and
   means, performed by the computer system, for indicating a location of the generated RIP version in the storage device in the RIP file location information.

17. The apparatus of claim 12, wherein the print file is in a format which is a member of the set of formats comprising PostScript, TIFF, PDF, and PCL.

18. The apparatus of claim 12, wherein the storage device is comprised of a first storage device and a second storage device linked to the computer system, wherein the print file is stored in the first storage device and the RIP version of the print file is stored in the second storage device.

19. The apparatus of claim 12, further including:
   means, performed by the computer system, for determining whether a user has indicated to not submit the RIP version of the print file in the location indicated in the location information, and wherein the means for transmitting the RIP version does not transmit the RIP version when the user has indicated to not submit the RIP version.

20. The apparatus of claim 19, further comprising:
   a monitor attached to the computer system;
   an input device attached to the computer system; and
   wherein the means for determining whether the user indicated to not submit the RIP version of the print file further comprises means for displaying a field on the monitor in which the user indicates with the input device whether to not submit the RIP version of the accessed print file in the location indicated in the RIP file location information.

21. The apparatus of claim 20, wherein the means for determining whether the user indicated to not submit the RIP version, further comprises:
   means for displaying on the monitor information on the accessed print files included in the print job; and
   means for displaying on the monitor information indicating whether to submit a RIP version of the print file in the location indicated in the RIP file location information.

22. The apparatus of claim 21 further including, means, performed by the computer, for displaying the information in a GUI displayed on the monitor.

23. An article of manufacture for use in programming a computer, the article of manufacture comprising a computer readable storage medium having a computer program embodied therein that causes the computer to perform the steps of:
   (a) creating a job ticket, wherein the job ticket includes:
      (1) information on a plurality of print files included in a print job, wherein the print files include data representing graphical images;
      (2) print file location information indicating a location of the print files in the storage device; and
      (3) Raster Image Processor (RIP) file location information indicating a location of a RIP version of a print file in the storage device, wherein the RIP version is generated from the print file;
   (b) submitting the job ticket for printing, including the steps of:
      (1) accessing a print file in the location indicated in the print file location information;
      (2) determining whether there is a RIP version of the accessed print file; and
      (3) transmitting the RIP version of the accessed print file from the location indicated in the RIP file location information to a printer upon determining that there is a RIP version of the accessed print file.

24. The article of manufacture of claim 23, wherein the step of submitting the job ticket further includes the step of determining whether the RIP version was modified after the accessed print file was modified upon determining that there is a RIP version of the accessed print file; and wherein the step of transmitting the RIP version occurs upon determining that the RIP version was modified after the accessed print file was modified.

25. The article of manufacture of claim 24, further including the steps of:

generating a RIP version from the accessed print file upon determining at least one of the following: (1) that the RIP version was modified before the accessed print file was modified and (2) that there is no RIP version of the print file in the storage device; and transmitting the RIP version to the printer upon generating the RIP version from the accessed print file.

26. The article of manufacture of claim 25, wherein the computer system is comprised of a first computer, a second computer, and a network linking the first computer, the second computer, the printer, and the storage device, wherein the first computer performs the steps of creating the job ticket and submitting the job ticket for printing, and wherein the second computer performs the steps of generating the RIP version and transmitting the RIP version to the printer upon generating the RIP version.

27. The article of manufacture of claim 24, further comprising the steps of:

saving the RIP version in the storage device after generating the RIP version from the accessed print file; and indicating a location of the generated RIP version in the storage device in the RIP file location information.

28. The article of manufacture of claim 23, wherein the print file is in a format which is a member of the set of formats comprising PostScript, TIFF, PDF, and PCL.

29. The article of manufacture of claim 23, wherein the storage device is comprised of a first storage device and a second storage device linked to the computer system, wherein a print file is stored in the first storage device and a RIP version of the print file is stored in the second storage device.

30. The article of manufacture of claim 23, further comprising the step of determining whether a user has indicated to not submit the RIP version of the print file in the location indicated in the location information, and wherein the step of transmitting the RIP version does not occur if the user has indicated to not submit the RIP version.

31. The article of manufacture of claim 30, wherein a monitor and input device are attached to the computer system, and wherein the step of determining whether the user indicated to not submit the RIP version further comprises the step of displaying a field on the monitor in which the user indicates with the input device whether to not submit the RIP version of the print file in the location indicated in the RIP file location information.

32. The article of manufacture of claim 31, wherein the step of determining whether the user indicated to not submit the RIP version, further comprises the steps of:

displaying on the monitor information on the accessed print files included in the print job; and displaying on the monitor information indicating whether to submit a RIP version of the print file in the location indicated in the RIP file location information to the printer.

33. The article of manufacture of claim 32 wherein the information is displayed in a GUI displayed on the monitor.

* * * * *

UNITED STATES PATENT AND TRADEMARK OFFICE
CERTIFICATE OF CORRECTION

PATENT NO.  : 6,052,198
DATED       : April 18, 2000
INVENTOR(S) : Neuhard et al.

It is certified that error appears in the above-identified patent and that said Letters Patent is hereby corrected as shown below:

Column 1,
Line 12, after "Goertz" delete "." and insert -- , --.

Column 2,
Line 18, delete "llowever" and insert However

Column 5,
Line 9, delete "xx/xxx,xxx" and insert -- 08/931,013 --
Line 14, delete "xx/xxx,xxx" and insert -- 08/829,844 --

Column 10,
Line 8, delete "xx/xxx,xxx" and insert -- 08/932,066 --

Column 12,
Line 37, delete "regenerate" and insert re-generate
Line 40, delete "RIPI" and insert RIP Column 33,
Line 17, delete "(b)" and insert -- (d) --

Signed and Sealed this

Eleventh Day of September, 2001

*Attest:*

NICHOLAS P. GODICI
*Attesting Officer*   *Acting Director of the United States Patent and Trademark Office*